(12) United States Patent
Mizuno et al.

(10) Patent No.: US 10,599,727 B2
(45) Date of Patent: Mar. 24, 2020

(54) TRANSCODING AND SERVING RESOURCES

(71) Applicant: Google LLC, Mountain View, CA (US)

(72) Inventors: Hiroshi Mizuno, Tokyo (JP); Ryoichi Imaizumi, Mitaka (JP)

(73) Assignee: Google LLC, Mountain View, CA (US)

( * ) Notice: Subject to any disclaimer, the term of this patent is extended or adjusted under 35 U.S.C. 154(b) by 122 days.

(21) Appl. No.: 15/698,759

(22) Filed: Sep. 8, 2017

(65) Prior Publication Data
US 2018/0011935 A1    Jan. 11, 2018

Related U.S. Application Data

(63) Continuation of application No. 14/615,872, filed on Feb. 6, 2015, now Pat. No. 9,767,199, which is a
(Continued)

(51) Int. Cl.
*G06F 17/30* (2006.01)
*G06F 16/951* (2019.01)
(Continued)

(52) U.S. Cl.
CPC .......... *G06F 16/951* (2019.01); *G06F 16/248* (2019.01); *G06F 16/9535* (2019.01)

(58) Field of Classification Search
CPC .. G06F 16/951; G06F 16/9535; G06F 16/248; G06F 17/30554; G06F 17/30864; G06F 17/30867; G06F 17/30899
(Continued)

(56) References Cited

U.S. PATENT DOCUMENTS

| 6,023,714 A | 2/2000 | Hill et al. |
| 6,237,030 B1 | 5/2001 | Adams et al. |

(Continued)

FOREIGN PATENT DOCUMENTS

| WO | WO 2002019172 | 3/2002 |
| WO | WO2006001920 | 1/2006 |
| WO | WO 2007059503 | 5/2007 |
| WO | WO 2008003699 | 1/2008 |

OTHER PUBLICATIONS

"Algorithmic efficiency," Wikipedia, the free encyclopedia, Sep. 22, 2016 [retrieved on Sep. 30, 2016]. Retrieved from the Internet: URL<https://en.wikipedia.org/wiki/Algorithmic_efficiency>, 8 pages.
(Continued)

*Primary Examiner* — Sheree N Brown
(74) *Attorney, Agent, or Firm* — Fish & Richardson P.C.

(57) ABSTRACT

Methods, systems, and apparatus, including computer programs encoded on a computer storage medium, for transcoding and providing resources. A query is received. A resource is generated, and the resource, when processed by a client device, causes the client device to perform various operations. The operations include displaying a search result having an associated landing page and detecting user interaction with the search result. The operations include, in response to detecting user interaction with the search result, displaying a first portion of the landing page that is embedded within the resource and requesting, over a network, a second portion of the landing page. The operations include receiving the second portion of the landing page, and loading the second portion of the landing page. The generated resource is provided in response to the query.

20 Claims, 12 Drawing Sheets

Related U.S. Application Data continuation of application No. 13/752,599, filed on Jan. 29, 2013, now Pat. No. 8,965,880.

(60) Provisional application No. 61/727,236, filed on Nov. 16, 2012, provisional application No. 61/710,381, filed on Oct. 5, 2012.

(51) Int. Cl.
  *G06F 16/248* (2019.01)
  *G06F 16/9535* (2019.01)
(58) Field of Classification Search
  USPC .................................................. 707/722
  See application file for complete search history.

(56) References Cited

U.S. PATENT DOCUMENTS

| | | | |
|---|---|---|---|
| 6,252,597 | B1 | 6/2001 | Lokuge |
| 6,535,888 | B1 | 3/2003 | Vijayan et al. |
| 6,594,670 | B1 | 7/2003 | Genser |
| 6,598,043 | B1 | 7/2003 | Baclawski |
| 6,665,836 | B1 | 12/2003 | Wynblatt et al. |
| 6,758,394 | B2 | 7/2004 | Maskatiya et al. |
| 6,763,351 | B1 | 7/2004 | Subramaniam et al. |
| 6,785,670 | B1 | 8/2004 | Chiang et al. |
| 6,961,731 | B2 | 11/2005 | Holbrook |
| 7,027,507 | B2 | 4/2006 | Wu |
| 7,039,875 | B2 | 5/2006 | Khalfay et al. |
| 7,076,743 | B2 | 7/2006 | Ingram et al. |
| 7,082,476 | B1 | 7/2006 | Cohen et al. |
| 7,162,493 | B2 | 1/2007 | Weiss et al. |
| 7,228,506 | B2 | 6/2007 | Ivanovic et al. |
| 7,299,222 | B1 | 11/2007 | Hogan et al. |
| 7,370,036 | B2 | 5/2008 | Vedula |
| 7,421,432 | B1 | 9/2008 | Hoetzle et al. |
| 7,493,315 | B2 | 2/2009 | Holbrook |
| 7,546,538 | B2 | 6/2009 | Shuping et al. |
| 7,669,142 | B2 | 2/2010 | Ray et al. |
| 7,680,810 | B2 | 3/2010 | Marcjan et al. |
| 7,725,405 | B2 | 5/2010 | Johnson |
| 7,899,803 | B2 | 2/2011 | Chiang |
| 7,890,856 | B2 | 3/2011 | Cotter et al. |
| 8,041,709 | B2 | 10/2011 | Permandla et al. |
| 8,103,742 | B1 | 1/2012 | Green |
| 8,171,398 | B2 | 5/2012 | Hosotsubo |
| 2002/0010623 | A1 | 1/2002 | Mccollom et al. |
| 2002/0042799 | A1 | 4/2002 | Slotznick |
| 2002/0118214 | A1 | 8/2002 | Card et al. |
| 2002/0133566 | A1 | 9/2002 | Teeple |
| 2002/0194162 | A1 | 12/2002 | Rios et al. |
| 2003/0046259 | A1 | 3/2003 | Manrique et al. |
| 2003/0053091 | A1 | 3/2003 | Tanaka et al. |
| 2003/0146937 | A1 | 8/2003 | Lee |
| 2003/0146939 | A1 | 8/2003 | Petropoulos et al. |
| 2003/0169293 | A1 | 9/2003 | Savage |
| 2003/0237052 | A1 | 12/2003 | Danielsson |
| 2004/0017393 | A1 | 1/2004 | Easwar |
| 2004/0090464 | A1 | 5/2004 | Shake et al. |
| 2004/0203854 | A1 | 10/2004 | Nowak |
| 2004/0205514 | A1 | 10/2004 | Sommerer et al. |
| 2004/0205638 | A1 | 10/2004 | Thomas et al. |
| 2004/0205715 | A1 | 10/2004 | Taylor |
| 2004/0225922 | A1 | 11/2004 | Susarla et al. |
| 2004/0255233 | A1 | 12/2004 | Croney |
| 2005/0154781 | A1 | 7/2005 | Carlson et al. |
| 2005/0240391 | A1 | 10/2005 | Lekutai |
| 2005/0261891 | A1 | 11/2005 | Chan et al. |
| 2005/0278314 | A1 | 12/2005 | Buchheit |
| 2006/0048051 | A1 | 3/2006 | Lazaridis |
| 2006/0059418 | A1 | 3/2006 | Elkady |
| 2006/0069617 | A1 | 3/2006 | Milener et al. |
| 2006/0069670 | A1 | 3/2006 | Khaliq et al. |
| 2006/0074868 | A1 | 4/2006 | Khaliq et al. |
| 2006/0085741 | A1 | 4/2006 | Weiner et al. |
| 2006/0095424 | A1 | 5/2006 | Petropoulos et al. |
| 2006/0173824 | A1 | 8/2006 | Bensky et al. |
| 2006/0200455 | A1 | 9/2006 | Wilson |
| 2006/0200767 | A1 | 9/2006 | Glaeske et al. |
| 2006/0224445 | A1* | 10/2006 | Axe .................. G06Q 30/02 705/14.69 |
| 2006/0230344 | A1 | 10/2006 | Jennings et al. |
| 2006/0248078 | A1 | 11/2006 | Gross et al. |
| 2006/0294476 | A1 | 12/2006 | Buckley |
| 2007/0118640 | A1 | 5/2007 | Subramanian et al. |
| 2007/0260635 | A1 | 11/2007 | Ramer et al. |
| 2008/0010387 | A1 | 1/2008 | Curtis |
| 2008/0018658 | A1 | 1/2008 | Bruno |
| 2008/0019281 | A1 | 1/2008 | Liger et al. |
| 2008/0071739 | A1 | 3/2008 | Kumar et al. |
| 2008/0288459 | A1 | 11/2008 | Kim et al. |
| 2008/0288515 | A1 | 11/2008 | Kim et al. |
| 2009/0043689 | A1 | 2/2009 | Yang et al. |
| 2009/0049062 | A1 | 2/2009 | Chitrapura |
| 2009/0100228 | A1 | 4/2009 | Lepeska et al. |
| 2009/0265243 | A1* | 10/2009 | Karassner ........... G06Q 30/02 705/14.54 |
| 2009/0282013 | A1* | 11/2009 | Joshi ..................... G06F 16/958 |
| 2009/0300490 | A1 | 12/2009 | Lejano et al. |
| 2009/0307188 | A1 | 12/2009 | Oldham et al. |
| 2010/0199197 | A1 | 8/2010 | Faletski et al. |
| 2010/0211893 | A1 | 8/2010 | Fanning et al. |
| 2010/0223322 | A1 | 9/2010 | Mott et al. |
| 2010/0228712 | A1* | 9/2010 | Wexler ............... G06Q 30/02 707/706 |
| 2011/0004517 | A1* | 1/2011 | Soto .................. G06Q 30/02 705/14.51 |
| 2011/0029641 | A1 | 2/2011 | Fainberg |
| 2011/0055023 | A1 | 3/2011 | McNeeley et al. |
| 2011/0063310 | A1 | 3/2011 | Iwade et al. |
| 2011/0137933 | A1* | 6/2011 | Pelenur ............. G06F 16/9577 707/769 |
| 2011/0145321 | A1 | 8/2011 | Jiang |
| 2011/0231386 | A1 | 9/2011 | Wang et al. |
| 2012/0036264 | A1 | 2/2012 | Jiang et al. |
| 2012/0041980 | A1 | 2/2012 | Jiang et al. |
| 2012/0054167 | A1* | 3/2012 | Chi .................... G06F 16/9535 707/706 |
| 2012/0059713 | A1* | 3/2012 | Galas ................ G06Q 30/0244 705/14.49 |
| 2012/0066586 | A1 | 3/2012 | Shemesh |
| 2012/0102392 | A1 | 4/2012 | Reesman et al. |
| 2012/0110437 | A1 | 5/2012 | Pan |
| 2012/0159307 | A1 | 6/2012 | Ching |
| 2012/0194519 | A1 | 8/2012 | Bissell |
| 2012/0204094 | A1 | 8/2012 | Liang |
| 2012/0259702 | A1 | 10/2012 | Zhang et al. |
| 2012/0290974 | A1* | 11/2012 | Doig .................. G06F 16/958 715/808 |
| 2013/0024283 | A1* | 1/2013 | Axe ................... G06Q 30/02 705/14.54 |
| 2013/0054583 | A1* | 2/2013 | MacKlem ......... G06F 16/24578 707/723 |
| 2013/0117252 | A1 | 5/2013 | Samaddar et al. |
| 2013/0151652 | A1 | 6/2013 | Brech |
| 2013/0198641 | A1 | 8/2013 | Brownlow et al. |
| 2013/0212465 | A1 | 8/2013 | Kovatch |
| 2013/0219024 | A1 | 8/2013 | Flack |
| 2014/0040423 | A1* | 2/2014 | Goh .................. G06Q 30/0241 709/217 |
| 2014/0344666 | A1 | 11/2014 | Bleakley |
| 2015/0199357 | A1 | 7/2015 | Hwang et al. |
| 2015/0242908 | A1* | 8/2015 | Kobyakov ......... G06Q 30/0277 705/14.73 |

OTHER PUBLICATIONS

"Content Delivery Network," downloaded from the internet on Nov. 20, 2013, 7 pages, http://en.wikipedia.org/wik/Content_delivery_network.

"I Need the innerHTML of a div tag and so far it is impossible to get," The Official Microsoft ASP.Net Forum, downloaded from the

(56) References Cited

OTHER PUBLICATIONS internet on Oct. 3, 2012, 4 pages, www.forums.asp.net/t/1105081.aspx.
"Minimize round-trip times," Aug. 23, 2012, accessed from https://developers.google.com/speed/docs/best-practices/rtt, 2 pages.
Announcing Instant Pages, Google Webmaster Central Blog, Jun. 14, 2011, downloaded from the internet on Jan. 24, 2013, 5 pages, www.googlewebmastercentral.blogspot.com/2011/06/announcing-instant-pages.html.
Browster: "Browse Search Results Instantly!" www.browster.com; Mar. 16, 2006 (print date), 8 pages.
Butterfield et al., "A Dictionary of Computer Science," Oxford University Press, Apr. 1, 2016, 2 pages.
Farber, Dan: "Browsing at 2x Normal Speed"; http://blogs.zdnet.com/BTL; Feb. 14, 2005, 2 pages.
Google Developers, Make the Web Faster—Optimize Browser Rendering, May 5, 2012, pp. 1-10 http://web.archive.org/web/20120505144628/https://developers.google.com/speed/docs/best-practices/rendering.
Google's New Instant Pages Feature to Pre-Load Search Results, downloaded from the internet on Jan. 24, 2013, 2 pages, www.examiner.com/article/google-s-new-instant-pages-feature-to-pre-load-search-results.
How Browsers Work, Behind the Scenes of Modern Web Browsers, downloaded from the internet on Sep. 29, 2012, 26 pages, www.taligarsiel.com/Projects/howbrowserswork1.htm#The_render_tree_relation_to_the_DOM_tree.
Javascript—Using Document.InnerHTML to Dynamically Generate Form Within DIV Tag—Stack Overflow, downloaded from the internet on Jan. 24, 2013, 3 pages, www.stackoverflow.com/questions/5387487/using-document-innerhtml-to-dynamically-generate-form-within-div-tag.
Javascript Tutorial—innerHTML, downloaded from the internet on Oct. 3, 2012, 2 pages, www.tizag.com/javascriptT/javascript-innerHTML.php.
Jou, Chichang, A Semantics-Based Mobile Web Content Transcoding Framework, Recent Advances in Wireless Communications and Networks, Prof. Jia-Chin Lin (Ed.) 2011, 19 pages, InTech, Available from: http://www.intechopen.com/books/recent-advances-in-wireless-communications-and-networks/a-semantics-based-mobile-web-content-transcoding-framework.
Knocking Down Barriers to Knowledge, Google Official Blog, Jun. 14, 2011, downloaded from the internet on Jan. 24, 2013, 4 pages, www.googleblog.blogspot.com/2011/06/knocking-down-barriers-to-knowledge.html.
Laplante, "Dictionary of Computer Science Engineering and Technology," CRC Press, Dec. 2000, p. 93.
Mandavi, Mehregan et al., "Web Transcoding for Mobile Devices Using a Tag-Based Technique," World Appl. Sci. J., 10 (Special Issue of Comp. & Elect. Eng.), pp. 49-58, 2010.
Roberts et al., "Visual Bracketing for Web Search Result Visualization", Proceedings of Information Visualization (1V03), pp. 264-269, IEEE Computer Society, Jul. 2003.
SADIe: Structural-Semantics for Accessibility and Device Independence, downloaded from the internet on Sep. 22, 2012, 2 pages, www.wel.cs.manchester.ac.uk/research/sadie/.
Sampling Statistics, from Wikipedia, the free encyclopedia, downloaded from the internet on Sep. 29, 2012, 15 pages, www.en.wikipedia.org/wild/Sampling_(statistics)#Sampling_methods.
Tobin Titus et al, w3c Editors Draft Resource Priorities, Feb. 11, 2013, pp. 1-13 https://dvcs.w3.org/hg/webperf/rawfile/tip/specs/ResourcePriorities/Overview.html.
ViewFour.com—ViewSmart, downloaded from the internet on Jan. 24, 2013, 5 pages, http://download.cnet.com/ViewFour-com-ViewSmart/3000-8022_4-10391975.html.
Waibel et al., "Minimizing computational cost for dynamic programming algorithms," Carnegie Mellon University, Computer Science Department, Jun. 17, 1981, 26 pages.
Xiaoming Li et al., "Search Engine: Principles, Techniques and Systems", Science Publishing House, Apr. 2005, 19 pages. (English description included).
International Search Report and Written Opinion in International Application No. PCT/US2013/063500, dated Oct. 22, 2014, 13 pages.
Office Action issued in U.S. Appl. No. 13/752,599 dated May 7, 2013, 17 pages.
Office Action issued in U.S. Appl. No. 13/752,599 dated Sep. 10, 2013, 23 pages.
Office Action issued in U.S. Appl. No. 13/752,599 dated Sep. 30, 2013, 17 pages.
Office Action issued in U.S. Appl. No. 13/752,599 dated Feb. 24, 2014, 31 pages.
Notice of Allowance issued in U.S. Appl. No. 13/752,599 dated Oct. 14, 2014, 13 pages.
Office Action issued in U.S. Appl. No. 14/086,041 dated Mar. 14, 2014, 37 pages.
Notice of Allowance issued in U.S. Appl. No. 14/086,041 dated Sep. 4, 2014, 15 pages.
International Search Report and Written Opinion in International Application No. PCT/US2014/065632, dated Feb. 6, 2015, 10 pages.
Office Action issued in U.S. Appl. No. 14/567,547 dated Sep. 29, 2016, 40 pages.
Office Action issued in U.S. Appl. No. 14/615,872 dated Feb. 1, 2016, 35 pages.
Office Action issued in U.S. Appl. No. 14/615,872 dated Jul. 7, 2016, 30 pages.
Office Action issued in U.S. Appl. No. 14/615,872 dated Dec. 12, 2016, 38 pages.
Notice of Allowance issue din U.S. Appl. No. 14/615,872, dated May 18, 2017, 8 pages.

* cited by examiner

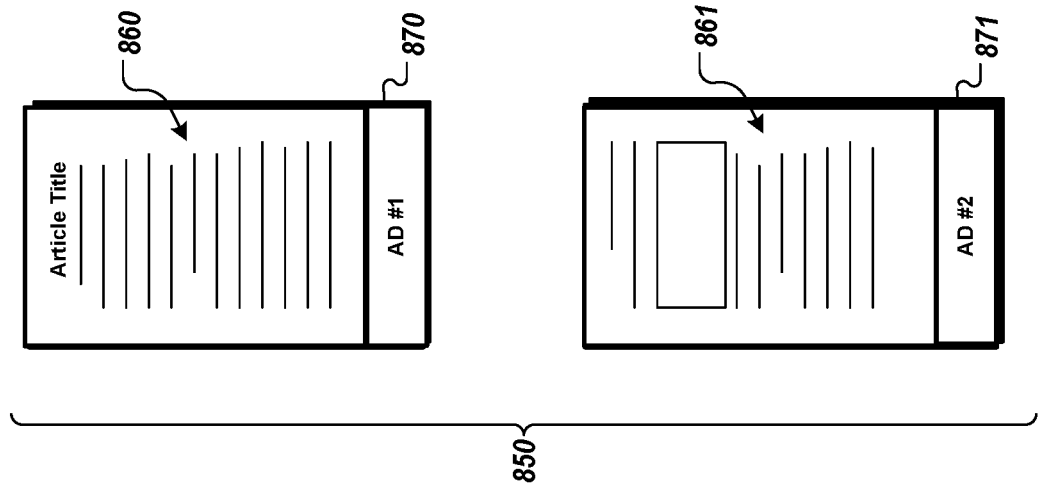
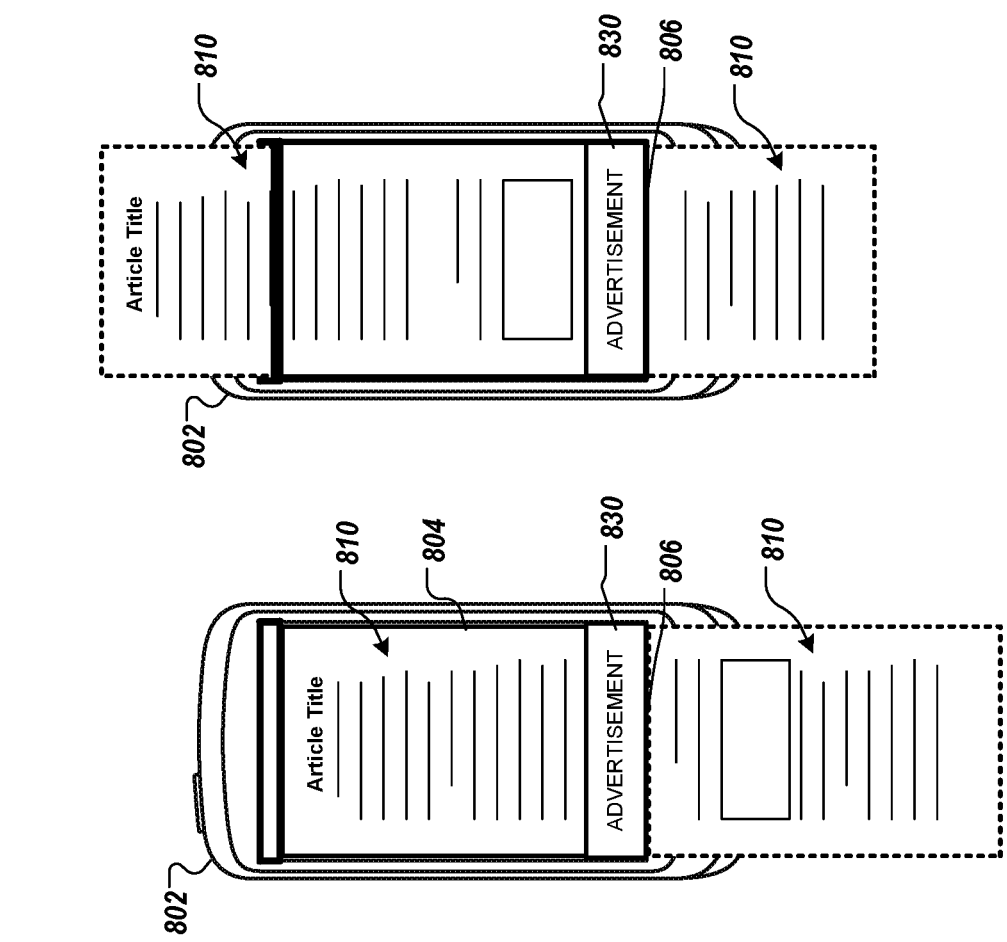
FIG. 8C
FIG. 8B
FIG. 8A

TRANSCODING AND SERVING RESOURCES

CROSS-REFERENCE TO RELATED APPLICATIONS

This application is a continuation of U.S. application Ser. No. 14/615,872, filed Feb. 6, 2015, which is a continuation of U.S. application Ser. No. 13/752,599, filed on Jan. 29, 2013, which claims the benefit of U.S. Provisional Application No. 61/710,381, filed on Oct. 5, 2012, and U.S. Provisional Application No. 61/727,236, filed on Nov. 16, 2012. The entire contents of each of the prior applications are incorporated herein by reference.

BACKGROUND

Internet search engines aim to identify resources (e.g., web pages, images, text documents, multimedia content, etc.) that are relevant to a user's needs and to present information about the resources in a manner that is useful to the user. Users typically submit queries that indicate the information the users desire to retrieve. In response to the user-submitted queries, search engines then provide search results that identify resources or other information.

SUMMARY

A search engine system may provide a search results page that includes content of resources referenced by search results. For example, search results may reference corresponding landing pages. Content of the landing pages may be included within the search results page, so that the content is transferred to a client device as part of the search results page. The search results page excludes at least a portion of the viewable content of each of the landing pages. When a user interacts with a search result, the client device may present a portion of the corresponding landing page without incurring a delay for content of the landing page to be downloaded, since the content was received in the search results page.

The portion of a landing page that is included in a search results page may be an above-the-fold portion of the landing page. The search results page may be generated so that, when a user interacts with a search result, a below-the-fold portion of the landing page is requested over a network and loaded. The above-the-fold portion and the below-the-fold portion may be displayed seamlessly for smooth scrolling between the two portions. Optionally, the below-the-fold portion may be loaded in a browsing context different from the browsing context for the above-the-fold portion of the landing page.

In some implementations, the landing pages referenced by search results are transcoded resources, or modified versions of the resources hosted by content providers. Transcoding may, for example, reduce bandwidth requirements, enhance security, and/or improve usability on mobile devices. An above-the-fold portion of each transcoded resource may be distinguished from a below-the-fold portion of the transcoded resource. Transcoded resources are stored in a manner that identifies the above-the-fold portion. For example, the above-the-fold portion and the below-the-fold portions may be stored separately, and may be hosted from different domains.

In some implementations, transcoding occurs separately from responding to search queries. Transcoded resources may be generated and stored in a repository and then later accessed to respond to subsequently submitted search queries. For example, transcoded resources may be generated and stored during an indexing phase. In this manner, the transcoded resources are already available at the time a query is received and a search results page is generated.

To facilitate transcoding, transcoding templates may be generated by analyzing sets of multiple resources. To generate a transcoding template, each of a set of resources may be rendered, and aspects of the renderings may be used select content that meets one or more criteria. Commonalities among the selected content of multiple resources can be used to generate the transcoding template, which may indicate what content to include or to remove in when transcoding resources with particular characteristics.

In general, when a document includes links or references to resources, the document can include the transcoded above-the-fold content for one or more of the linked resources. For example, a document that includes links to a plurality of resources can include the transcoded above-the-fold content for each of the plurality of linked resources. In some implementations, portions of resources are embedded in resources other than search results pages. In the same manner that a first portion (such as an above-the-fold portion) of a landing page of a search result may be included in a search results page, a portion of a resource may be included in a resource that includes one or more of, blog content, news content, social media data, map content, video or other media content, electronic book content, electronic mail messages, electronic coupons, shopping information, or other content, in addition to or instead of search results. In general, any document that includes a link (e.g., hyperlink) or other reference to a resource may include a portion of the referenced resource embedded within the document. The document may be provided so that, when the document is displayed, the embedded portion may be hidden from view, for example, hidden until a user interacts with a link or provides user input that otherwise indicates interest in the embedded content.

Resources that include portions of other resources can be provided in response to a variety of data or events, in addition to or instead of search queries submitted by users. For example, a resource having above-the-fold content of a referenced resource may be provided in response to any appropriate user data, such as user input, a request for a resource, or data indicating a location or preference of a user. Resources having the embedded content of other resources may be provided in response to events, such as reaching the end of media playback, receipt of an e-mail message, or the occurrence of another predetermined event.

One or more of the following aspects of this disclosure can be embodied alone or in combination as methods that include the corresponding operations. One or more of the following aspects can be embodied alone or in combination as corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

One innovative aspect of the subject matter described in this specification is embodied in methods that include the actions of: receiving a query; generating a resource that, when processed by a client device, causes the client device to: (i) display a search result having an associated landing page; (ii) detect user interaction with the search result; (iii) in response to detecting user interaction with the search result: (a) display a first portion of the landing page that is embedded within the resource; and (b) request, over a network, a second portion of the landing page; (iv) receive, over the network, the second portion of the landing page; and (v) load the second portion of the landing page; and providing the generated resource in response to the query.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, the resource, when processed by the client device, causes the client device to load the second portion of the landing page in a browsing context different from a browsing context in which the first portion of the landing page is loaded. The first portion of the landing page includes above-the-fold content of the landing page, and the second portion of the landing page includes below-the-fold content of the landing page. The first portion of the landing page includes all of the above-the-fold content of the landing page, and the second portion of the landing page includes content of the landing page not included in the first portion. The above-the-fold content in the first portion provides a continuous top region of the landing page. The second portion includes content for a continuous region of the landing page that displays adjacent to and below the continuous top region. The above-the-fold content in the first portion includes all of the content that displays as an initial view of the landing page on the client device the second portion includes content that displays at a region outside the initial view of the landing page. When the above-the-fold content in the first portion is displayed, the above-the-fold portion fills a display area of the client device. The first portion of the landing page includes content that, when displayed, fills a browser display area, and wherein the first portion of the landing page includes less than all of the content of the landing page. The above-the-fold content includes HyperText Markup Language (HTML) content that displays at a top region of the landing page.

These and other embodiments may each optionally include one or more of the following features. For instance, generating the resource includes generating the resource to include the first portion of the landing page as a string within the resource. Generating the resource includes generating a resource that, when processed by the client device, causes the client device to display the search result without displaying the above-the-fold content of the landing page. Generating the resource includes generating a resource that, when processed by the client device, further causes the client device to render the above-the-fold content in response to detecting user interaction with the search result; and, to display the above-the-fold content, the client device displays the rendered above-the-fold content. Generating the resource includes generating the resource such that: (i) when processed by the client device, the resource causes the client device to display a plurality of search results each associated with a different landing page; and (ii) the resource includes above-the-fold content for multiple of the different landing pages referred to by the plurality of search results. Generating the resource includes generating the resource such that the first portion of the landing page is included in the resource as part of the resource. The first portion includes all of the text content in an initial view of the landing page on the client device, wherein the initial view includes the entire portion of the landing page that is on the client device before scrolling. The first portion excludes at least some of the text content of the landing page that is not visible in the initial view. Together, the first portion and the second portion include all of the text content of the landing page, and the second portion excludes text content of the landing page that would be displayed in the initial view. The landing page is a transcoded version of an original resource and is provided to the client device from a domain different from a domain from which the original resource is served. At least some displayable content of the original resource is omitted from the landing page, and at least some Javascript content of the original resource is omitted from the landing page. The original resource includes content that invokes functions that are not included in a predetermined set of functions classified as being secure, and the landing page omits the content that invokes the functions that are not included in a predetermined set of functions. The original resource is a document that includes a central region, a header, footer, and user-submitted comments, and wherein the landing page includes the central region and omits one or more of the header, footer, and user-submitted comments.

One innovative aspect of the subject matter described in this specification is embodied in methods that include the actions of: receiving a request; generating a document that, for each of multiple resources, includes a first portion of the resource and excludes a second portion of the resource; and providing the document with the included first portions of the multiple resources in a single response to the request.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, the document is provided in a single file or a single network transaction. The request is a search query, and the document is provided in response to the search query. The document identifies multiple search results where the multiple resources are landing pages for the multiple search results. The first portions of the multiple resources are above-the-fold portions of the multiple resources. The second portions of the multiple resources are below-the-fold portions of the multiple resources. A repository that includes transcoded resources for resources in multiple domains is accessed. The first portions of the multiple resources are obtained from the repository. When processed by a client device, the document causes the client device to display one or more of the multiple search results and detect user interaction with one or more displayed search results. In response to detecting user interaction with a displayed search result, the document causes the client device to display the included first portion of the landing page included in the document, and request a second portion of the landing page over a network. When processed by a client device, the document causes the client device receive, the second portion of the landing page over the network and load the second portion of the landing page in a browsing context different from a browsing context in which the first portion of the landing page is loaded.

One innovative aspect of the subject matter described in this specification is embodied in methods that include the actions of: obtaining content of a resource that is associated with a Uniform Resource Locator (URL) and a domain; selecting, based on the URL of the resource, a transcoding template generated based on renderings of a plurality of other resources in the domain; selecting a subset of the content based on the selected transcoding template; generating a transcoded resource that includes the selected subset of the content; identifying above-the-fold content of the transcoded resource; and storing the transcoded resource and designating the above-the-fold content of the transcoded resource.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, generating the transcoded resource includes: determining that the resource includes one or more elements that do not affect the visual appearance of a rendering of the resource; and generating a transcoded resource that excludes the one or more elements determined to not affect the visual appearance of the rendering. Generating the transcoded resource includes: identifying elements of the resource that have inline style attributes; determining that the inline style attributes for a plurality of the elements have at least a threshold level of similarity; and including, in the transcoded resource, the plurality of the elements and a single style definition for the plurality of the elements, without including the inline style attributes corresponding to the plurality of the elements. Generating the transcoded resource includes: identifying an image referenced by the resource; determining a size of the image; determining that the size of the image satisfies a size threshold; determining an update frequency for the image; determining that the update frequency satisfies an update frequency threshold; based on determining that the size satisfies the size threshold and determining that the update frequency satisfies the update frequency threshold, embedding the image within the transcoded resource.

These and other embodiments may each optionally include one or more of the following features. For instance, generating the transcoded resource includes including variable names in the transcoded resource that are shorter than corresponding variable names in the resource. Generating the transcoded resource includes: identifying non-mandatory whitespace in the resource; and generating the transcoded resource to exclude the identified non-mandatory whitespace. Identifying one or more user-submitted comments in the resource; selecting the subset of the content of the resource based on evaluating the rendering includes selecting the subset of the content of the resource based on evaluating the rendering and identifying one or more user-submitted comments in the resource Generating the transcoded resource includes: identifying one or more elements designated as having an absolute position property or fixed position property; and including the one or more elements in the transcoded resource with a static position property.

These and other embodiments may each optionally include one or more of the following features. For instance, generating the transcoded resource includes: identifying content in the resource that invokes one or more functions; determining whether the one or more functions are included in a defined set of functions; and selectively including the identified content in the transcoded resource based on determining whether the one or more functions are included in the defined set of functions. Determining whether the one or more functions are included in the defined set of functions includes determining that a segment of the identified content does not invoke any functions that are not included in a set of functions classified as secure. Selectively including the identified content in the transcoded resource includes including the segment of the identified content in the transcoded resource in response to determining that a segment of the identified content does not invoke any functions that are not included in the set of functions classified as secure. Determining whether the one or more functions are included in the defined set of functions includes determining that a segment of the identified content invokes a function that is not included in a set of functions classified as secure. Selectively including the identified content in the transcoded resource includes excluding the one or more segments of the identified content from the transcoded resource in response to determining that the segment of the identified content invokes a function that is not included in the set of functions classified as secure.

These and other embodiments may each optionally include one or more of the following features. For instance, generating the transcoded resource includes including content in the transcoded resource that, when processed (e.g., rendered or invoked) by a client device, is operable to: detect a condition that causes an input field to be presented on a user interface; and display a message accompanying the input field in response to detecting a condition that causes an input field to be presented on a user interface, the message not being provided when the input field is presented based on the resource. To detect a condition that causes an input field to be presented on a user interface, the content in the transcoded resource is operable to detect receipt of a request for authentication. To display a message accompanying the input field, the content in the transcoded resource is operable to display a warning or a disclaimer associated with an authentication prompt produced by a user agent (e.g., web browser). The warning or disclaimer is distinct from the authentication prompt produced by the user agent. Generating the transcoded resource includes: generating the above-the-fold portion of the transcoded resource according to a first set of transcoding parameters; and generating the remainder of the transcoded resource according to a second set of transcoding parameters different from the first set of transcoding parameters.

One innovative aspect of the subject matter described in this specification is embodied in methods that include the actions of: selecting a set of resources based on commonalities in Uniform Resource Locators (URLs) for the resources; selecting a subset of the resources in the set; for each of the resources in the subset: (i) rendering the resource; (ii) evaluating the rendering; and (iii) assigning scores to different portions of the resource based on evaluating the rendering; generating a transcoding template based on the scores; and designating the transcoding template for use when transcoding a resource in the set of resources.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, selecting the set of resources based on commonalities in the URLs for the resources includes selecting the set of resources from among the resources in an Internet domain based on a hostname or URL depth of the respective URLs. Rendering the resource includes using a layout engine to process cascading style sheets (CSS) associated with the resource and generate a render tree for the resource. Evaluating the rendering includes evaluating the render tree. Evaluating the rendering includes: identifying interactive elements of the rendering; and evaluating a spatial distribution of the interactive elements within the rendering. Generating the resource based on the scores includes: selecting content of the respective resources in the subset based on the scores; identifying commonalities among the selected content of the respective resources; generating the transcoding template based on identifying the commonalities among the selected content for the respective resources in the subset. Identifying the commonalities among the selected content of the respective resources in the subset includes determining that corresponding portions of each of multiple of the resources in the subset are selected. Generating the transcoding template includes, based on determining that corresponding portions of each of multiple of the resources in the subset are selected, generating the transcoding template to indicate that content occurring in the portion should be included in transcoded resources.

These and other embodiments may each optionally include one or more of the following features. For instance, assigning scores to different portions of the resources includes determining interactivity scores for a region of the rendering based on an amount of area in the region that responds to user interaction. Generating the transcoding template includes: determining that the interactivity score satisfies a threshold; and generating the transcoding template based on determining that the interactivity score satisfies the threshold. Determining the interactivity score for the region includes determining a fraction of a number of pixels in the region that respond to user interaction and a total number of pixels in the region. Determining that the interactivity score satisfies the threshold includes determining that the fraction is less than the threshold. Generating the transcoding template based on determining that the interactivity score satisfies the threshold includes generating the transcoding template to indicate that the content corresponding to the region should be included in transcoded resources based on determining that the fraction is less than the threshold. Evaluating the rendering includes determining a text style for each of multiple portions of the rendering. Assigning scores to different portions of the resource includes assigning scores to each of the multiple portions of the rendering based on differences among the determined text styles for each of the multiple portions of the rendering. Generating the transcoding template includes generating a transcoding template that indicates content to include in a transcoded resource when transcoding a resource in the set of resources. Generating the transcoding template includes generating a transcoding template that indicates content to exclude from a transcoded resource when transcoding a resource in the set of resources.

Advantageous implementations can include one or more of the following features. The latency between a user's interaction with a search result and display of a corresponding landing page may be reduced. The number of network transactions required to view a search result may be reduced. Latency in downloading content of a resource may be hidden from a user. Security of landing pages for search results may be enhanced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 8A-8C are diagrams illustrating examples of advertisements.

Like reference numbers and designations in the various drawings indicate like elements.

DETAILED DESCRIPTION

Figure 1:
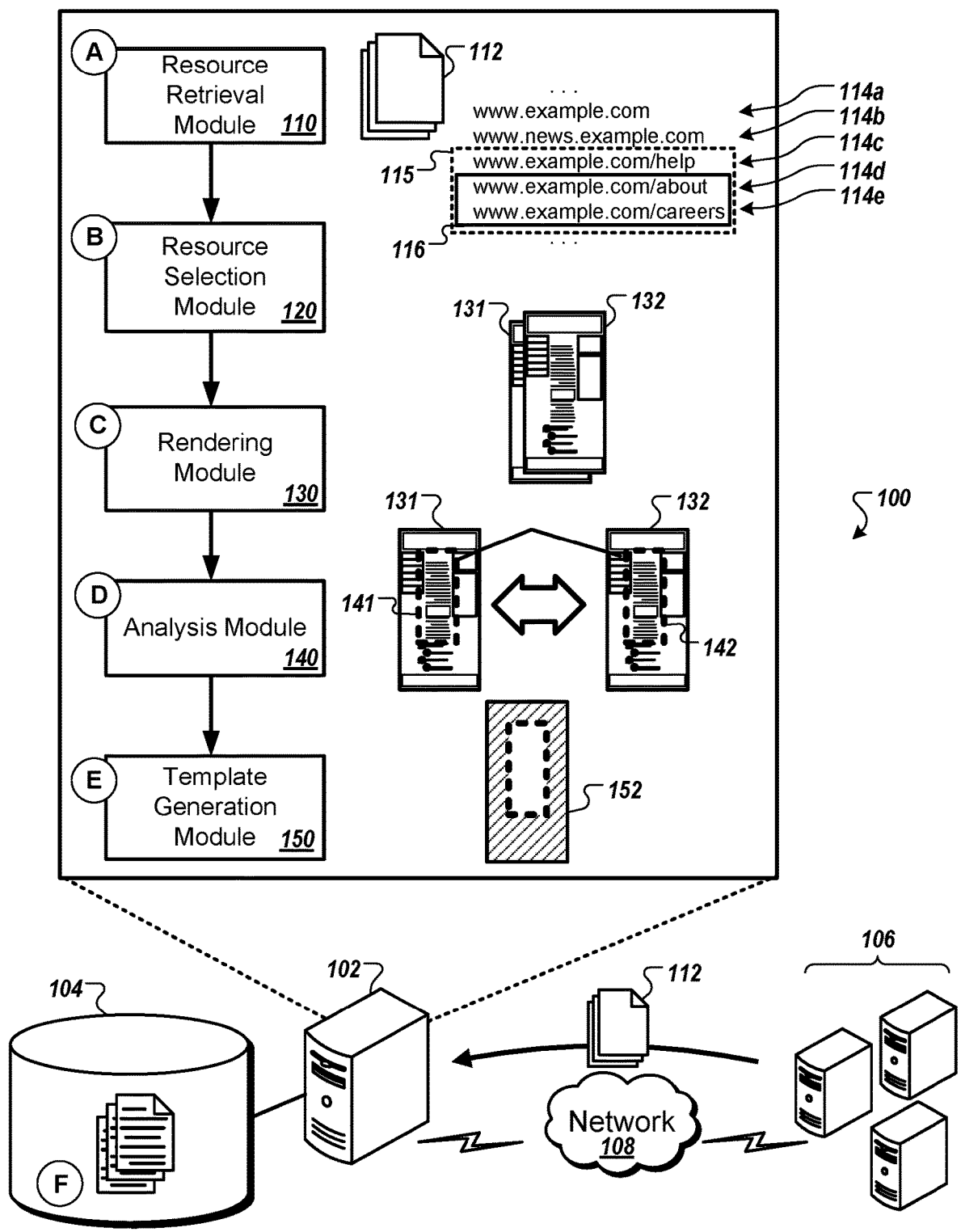
FIG. 1 is a diagram that illustrates an example of a system for generating transcoding templates.

FIG. 1 is a diagram that illustrates an example of a system 100 for generating transcoding templates. The system 100 includes a computing system 102 that communicates with one or more data storage devices 104. The computing system 102 includes a resource retrieval module 110, a resource selection module 120, a rendering module 130, an analysis module 140, and a template generation module 150. The computing system 102 communicates with servers 106 over a network 108. The diagram shows stages (A) to (F), which illustrate a flow of data, and which may occur in the sequence illustrated or in a different sequence.

The computing system 102 may generate a transcoding template that assists transcoding of resources in an Internet domain. The transcoding template may indicate content to include or exclude when generating transcoded versions of resources in the Internet domain. To generate the transcoding template, the computing system 102 may examine a subset of the resources hosted in a particular Internet domain. For example, the computing system 102 renders the resources in the subset, and analyzes various aspects of the renderings. The computing system 102 then generates the transcoding template to reflect commonalities or patterns identified among the analyzed renderings. Other documents in the domain are then inferred to share the identified commonalities or patterns. The transcoding template can be generated by analyzing fewer than all of the resources in a domain, for example, less than half, or a fiftieth of the resources in the domain.

Using the transcoding template may reduce the computational cost of transcoding resources, and may also improve the quality of transcoded resources. By analyzing renderings of a subset of the resources in the Internet domain and extrapolating their characteristics to a larger set of resources, each resource that is transcoded benefits from the analysis of renderings without incurring the computational cost of actually rendering each resource. Using a transcoding template that reflects characteristics of multiple resources may permit important content of resources to be identified more accurately and consistently than analyzing resources individually.

In some implementations, a set of resources is selected based on commonalities in the URLs for the resources. A subset of the resources in the set is selected. Each of the resources in the subset is rendered, and each rendering is evaluated. Scores are assigned to portions of the resources based on evaluating the renderings. A transcoding template is generated based on the scores, and the transcoding template is designated for use when transcoding a resource in the set of resources.

In stage (A), the resource retrieval module 110 obtains content of resources 112 over the network 108. For example, the resource retrieval module 110 crawls an Internet domain, identifying resources 112 hosted in the Internet domain and accessing the content of the resources 112.

In the illustrated example, the resource retrieval module 110 obtains the content of resources 112 in a domain "example.com." Each of the resources 112 has a corresponding Universal Resource Locator (URL). URLs 114a-114e correspond to different resources 112 in the domain.

In stage (B), the resource selection module 120 selects resources with which to generate a transcoding template. The resource selection module 120 may select resources based on commonalities in the structure of the URLs that correspond to the resources.

In some implementations, the resource selection module 120 identifies a set 115 of resources hosted in the domain that have URLs that have at least a threshold level of similarity. For example, the resource selection module 120 may examine a hostname and a URL depth for each URL 114a-114e. The hostname may be the portion of a URL that identifies a domain or subdomain (e.g., "example.com" or "news.example.com"). URL depth may be determined as a number of different path elements following the hostname, where each path element is separated by a slash or other delimiter. For example, the URL "www.example.com/about" may have a URL depth of one, and the URL "www.example.com/about/local" may have a URL depth of two.

URLs can be considered to be similar if, for example, the hostnames in the URLs match. As another example, URLs can be considered to be similar if they have the same hostname and the same URL depth. The level of similarity of resource may additionally or alternatively be determined based on, for example, whether resources have the same file type, or whether the resources represent dynamic content (e.g., server-generated content, which may be indicated by a .asp, .php, .jsp, or similar file extension) or static content.

From among a set 115 of resources determined to have a similar URL structure, the resource selection module 120 selects a sample subset 116, for example, by selecting fewer than all of the resources in the set 115. The resources in the sample subset 116 are then used to generate the transcoding template. For some domains, resources that have a similar URL structure also have a similar layout. For these domains, the resources in the sample set are likely to be representative of the general characteristics of other resources with similar URLs. In some implementations, the resource selection module 120 selects the sample subset 116 to include a particular number of resources, such as 50 or 100 resources. In some implementations, the sample subset 116 is selected randomly or pseudo randomly from among the resources determined to have a similar URL structure.

In the illustrated example, the resource selection module 120 determines that each of the URLs 114c-114e has the same hostname (e.g., "example.com") and the same URL depth (e.g., a URL depth of one). The resources corresponding to the URLs 114c-114e form a set 115. The resource selection module 120 selects the sample subset 116 from among the set 115. As described further below, the characteristics of the resources in the sample subset 116 are considered to represent the characteristics of the resources in the set 115 generally. Thus a transcoding template generated based on the characteristics of the resources in the sample subset 116 may be used to transcode any of the resources in the set 115 determined to have similar URL structure.

In stage (C), the rendering module 130 renders the resources in the sample subset 116. To render a resource, the rendering module 130 processes the resource with a layout engine (e.g., a web browser engine and or rendering engine), such as Webkit or Gecko, and produces renderings 131, 132. When rendering the resources, the layout engine obtains and processes cascading style sheets (CSS) associated with the respective resources. Other content that affects the manner in which the resources would be displayed may also be obtained and processed. Thus the rendering of a resource may reflect what would be presented on a client device more accurately than the content of the resource alone.

In some implementations, the layout engine produces a render tree as the rendering. The layout engine may be run in a "headless" mode, for example, without any visual display of the rendered content. The render tree may take into account the effects of cascading style sheets (CSS), while a document object model (DOM) tree typically does not. Accordingly, a render tree can provide information that is not available in a DOM tree. For example, in some instances, rendering a resource with associated CSS results in text formatting that is different from what is indicated by the content of a resource.

In stage (D), the analysis module 140 analyzes the renderings 131, 132 of the resources in the sample subset 116. For example, the analysis module 140 analyzes the render tree produced by the rendering module 130 for each of the resources in the sample subset 116. The analysis module 140 may also analyze other content of the resources in the sample subset 116, such as a DOM tree and the HyperText Markup Language (HTML) or other content of each resource in the sample subset 116.

The analysis module 140 uses patterns or commonalities among resources in the sample subset 116 to identify where the most important content of resources is generally located. The analysis module 140 may assign scores to different regions of the resources in the sample subset 116. Based on these scores, the analysis module may determine which portions of the resources most commonly satisfy one or more criteria. When multiple resources in the sample subset 116 each have corresponding portions that satisfy the one or more criteria, for example, by having scores that exceed a threshold, the portion can be determined to include important content that should be included in transcoded resources. Similarly, when multiple resources have corresponding portions that fail to satisfy the one or more criteria, or satisfy a different thresholds indicating that the portions include boilerplate or unimportant content, the portions may be designated for exclusion from transcoded resources.

In some implementations, the analysis module 140 compares the content of resources in the sample subset 116 to determine how similar various regions of the resources are. The analysis module 140 may determine, for each of several elements of a DOM tree or render tree, a similarity score that indicates how similar the element is to the same or a similar element of other resources in the sample subset 116. A high similarity with other resources can be indicative of boilerplate content, while a low similarity can be indicative of unique or important content that should be included in transcoded resources.

The analysis module 140 may assign scores to different portions of the resources based on other criteria, such as features of the renderings 131, 132. For example, the analysis module 140 may assign scores to various elements of the renderings 131, 132. Based on the scores, the analysis module may determine which content should be included or excluded from transcoded resources. For example, multiple resources in the sample subset 116 may include a particular content region (e.g., a header region, a footer region, a central region, etc.), in which content may vary or be consistent across multiple resources. The content region may be a particular spatial region of a rendering and/or the underlying HTML code that causes the region to be displayed. For each of the resources in the subset, the content region may be assigned a score. The respective scores for the content region are then evaluated, and if a sufficient number of the scores satisfy one or more criteria, the analysis module 140 determines that the content in that region should be included in transcoded resources.

The analysis module 140 may identify patterns or commonalities among the different resources by selecting content of various resources based on assigned scores and comparing the selected content for the respective resources. Content that is selected for multiple resources can be determined to represent portions of resources that should be included in transcoded resources, as further described below.

Figure 2A:
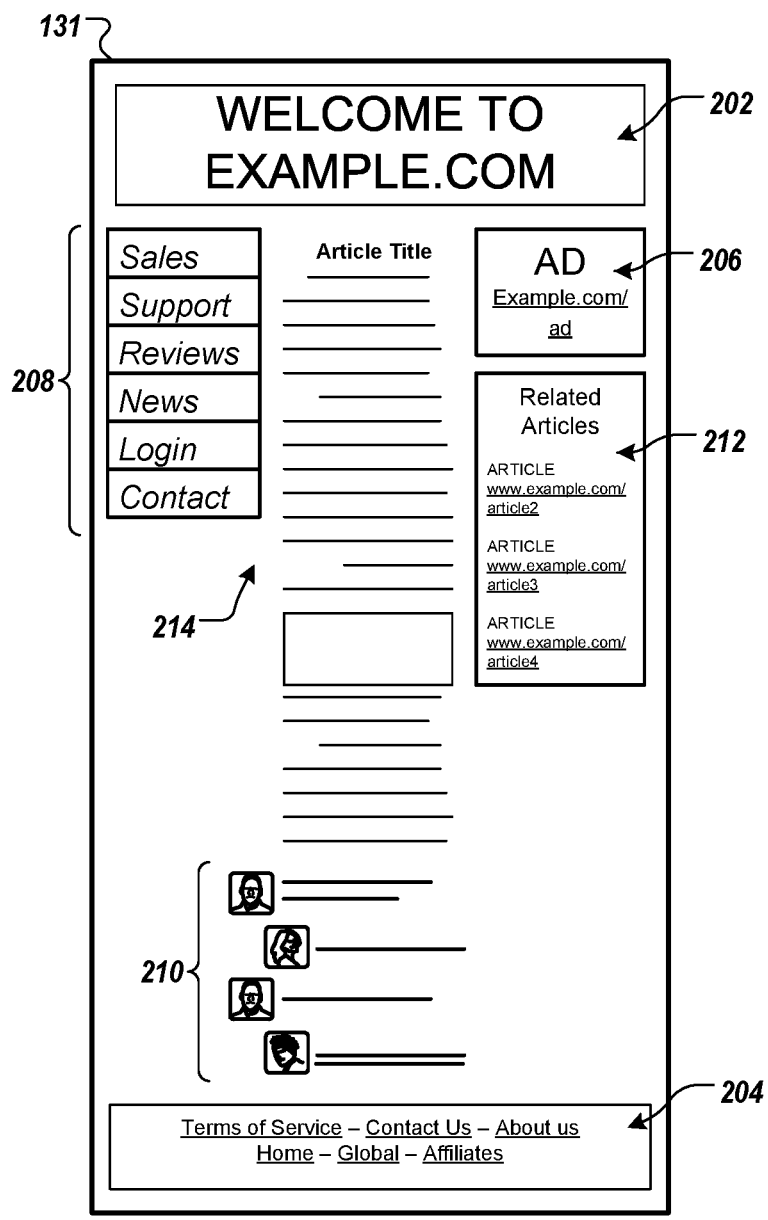
FIGS. 2A-2D are diagrams that illustrate examples of analyzing a resource.

FIGS. 2A-2D are diagrams that illustrate examples of analyzing a resource. In FIG. 2A, an example of a rendering 131 of a resource is shown. The rendering 131 includes various elements, including a header 202, a footer 204, an advertisement 206, a navigation bar 208, comments from users 210, a related content region 212, and a central content region 214. To determine which of these elements should be included in a transcoded version of the resource, the analysis module 140 may analyze the area within each element that responds to user interaction and the formatting of text in the various elements.

The analysis module 140 may determine which portions of the rendering 131 respond to user interaction, and which portions do not. For example, the analysis module 140 may identify content items that respond to user interaction (e.g., tapping, sliding, clicking, hovering, etc. by a user). Examples of content items that respond to user interaction include, for example, buttons, links, input fields, sliders, and scroll bars. The analysis module 140 may designate the pixels where these content elements are displayed as interactive pixels of the rendering 131, or pixels for which user interaction triggers an action by a web browser. The analysis module 140 may generate a representation, such as a virtual bitmap, an image, or other map of pixels, that distinguishes the interactive pixels from the other pixels in the rendering 131.

Figure 2B:
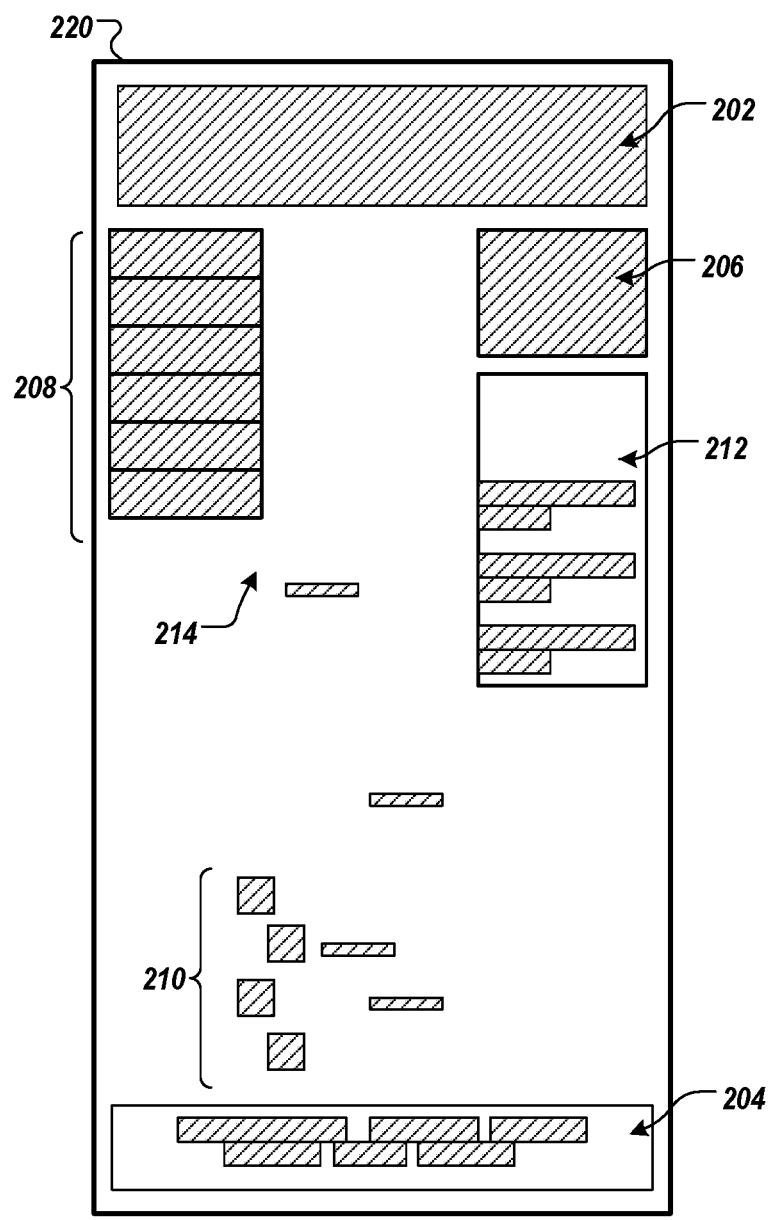

FIG. 2B illustrates an example of representation 220 that shows interactive pixels as shaded and non-interactive or passive pixels as not shaded. Elements that have more than a threshold proportion of interactive pixels may be considered to be boilerplate content, and may be designated for exclusion from transcoded resources.

In some implementations, the analysis module 140 determines a score for each of the elements of the rendering 131 based on a proportion of pixels of the rendering of the element that are interactive. For example, the analysis module 140 counts the number of interactive pixels for each element and counts the total number of pixels corresponding to each element. The analysis module 140 then determines a fraction of the number of interactive pixels to the total number of pixels. The analysis module 140 then compares the scores to a threshold. For example, the analysis module 140 may determine that 100% of the pixels in the header 202 are interactive, 40% of the pixels in the footer 204 are interactive, and 5% of the pixels in the central content region 214 are interactive. The analysis module 140 determines whether each of the scores is less than a threshold, such as 20% or 50%. Elements such as the header 202 and footer 204 that exceed the threshold may be selected as content to exclude from a transcoded resource. Elements such as the central content area 214 may be selected as content to include in a transcoded resource.

Figure 2C:
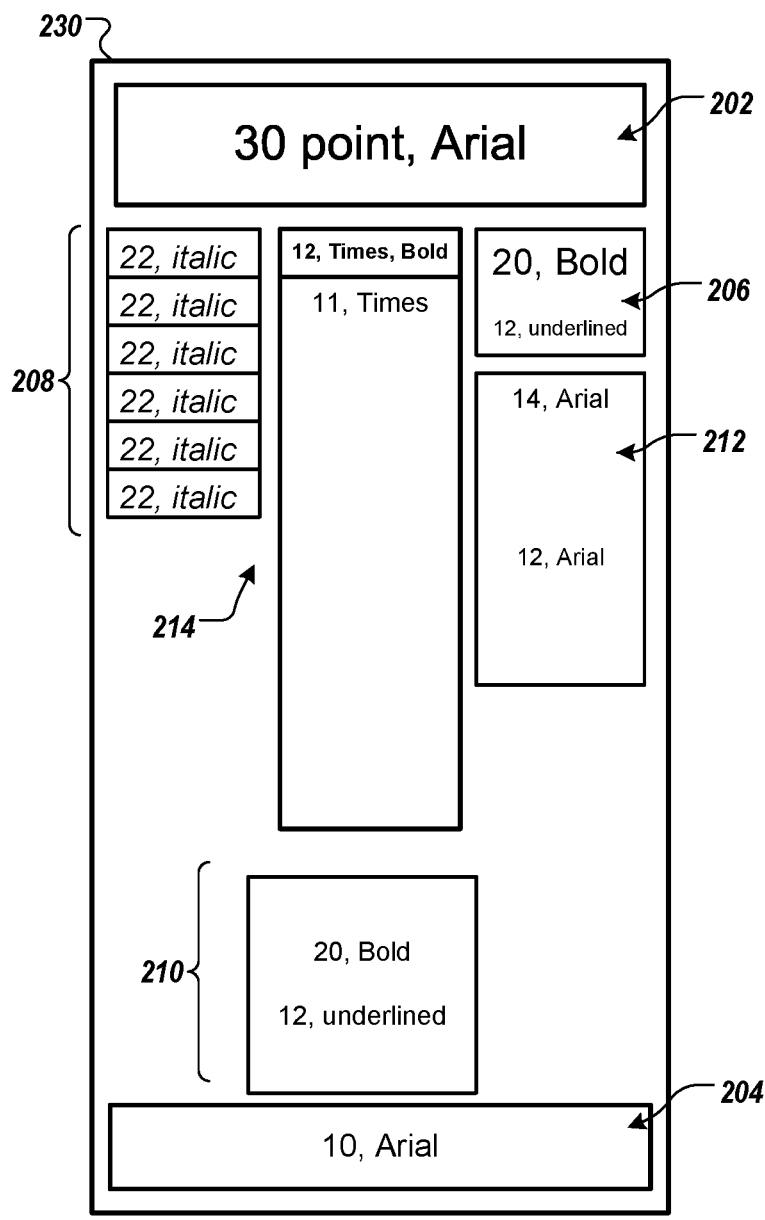

Referring to FIG. 2C, the analysis module 140 determines how text is formatted in each of the elements of the rendering 131. For purposes of example, various examples of different text styles, indicating point size, font, emphasis (e.g., bold, italic, underlined) are shown in FIG. 2C. Other aspects of text presentation, such as color, highlighting, may also be determined.

The analysis module 140 evaluates differences among the determined text styles. In some implementations, elements that include at least a threshold amount of text (e.g., a minimum number of words or characters) and display text with consistent formatting may be identified as content to include in a transcoded resource. Elements that include less than a threshold amount of text, or display text with formatting styles that vary more than a threshold amount (e.g., with sizes that exceed a maximum size difference), may be designated as content to exclude from a transcoded resource.

The analysis module 140 may assign text scores to an element of the rendering 131 based on a number of different text styles that occur within the element. The analysis module 140 may also assign the text scores based on differences between text formatting in element and text formatting in surrounding elements. As an example, because the central content region 214 has a large amount of text and the difference between the text sizes is less than a maximum size difference, the analysis module 140 may assign a score indicating that the central content region 214 should be included in a transcoded resource. As another example, because the advertisement 206 includes text sizes that vary more than a threshold amount, and because the text formatting is different from the formatting of surrounding elements by at least a threshold amount, the analysis module 140 may assign a score indicating that the central content region 214 should be excluded from a transcoded resource.

Figure 2D:
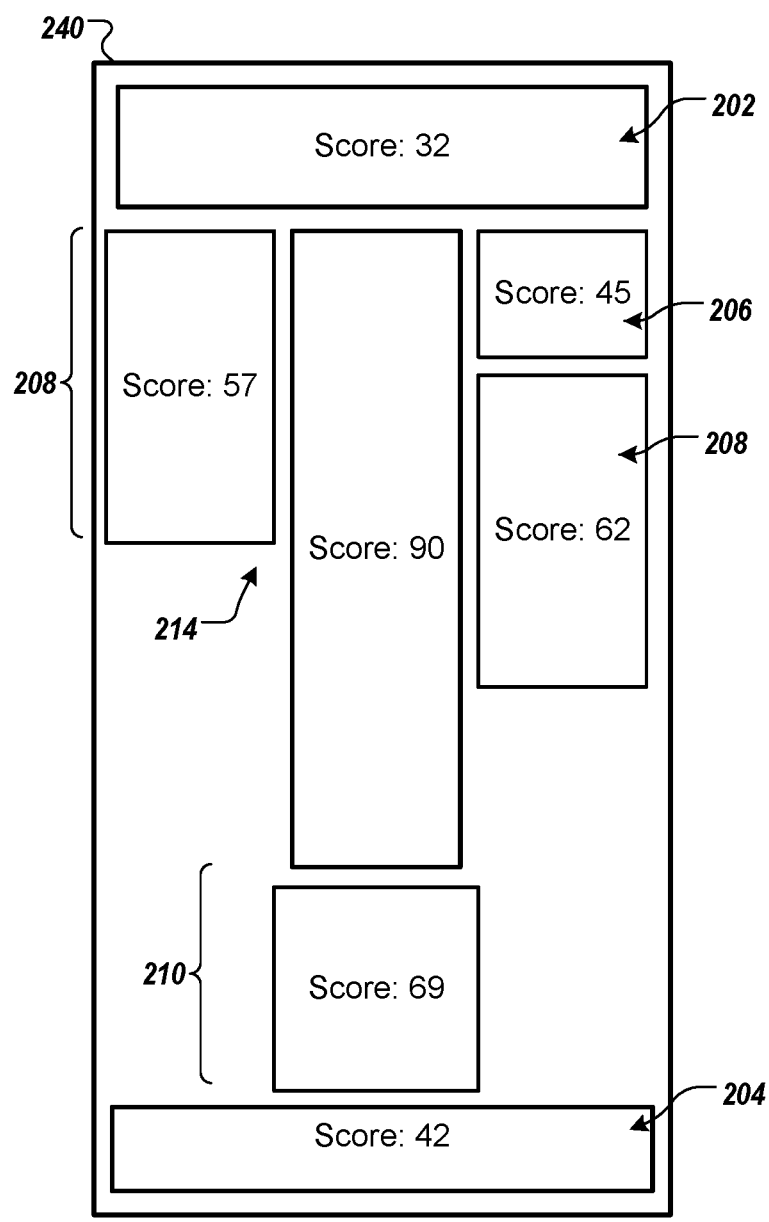

Referring to FIG. 2D, the analysis module 140 assigns scores to the elements of the rendering 131. The scores may be determined based on one or more criteria, such as an amount of area that responds to user interaction, differences in text formatting, similarity to content of other resources, and/or other factors. The analysis module 140 may select a subset of the elements as elements to include in a transcoded resource. In addition, or as an alternative, the analysis module 140 may select a subset of the elements as elements to exclude from a transcoded resource. In the illustrated example, the analysis module 140 selects elements that are assigned a score of 75 or higher as corresponding to content that should be included in a transcoded resource, resulting in the selection of the central content region 214 while excluding the remainder of the elements.

As noted above, the analysis module 140 may examine other aspects of the resources. The analysis module 140 may assign a similarity score that indicates how similar the content in one region of a resource is to the content displayed in the same region of other resources. For example, a similarity score can be assigned to a header element based on an amount of variation among the various headers in the resources in the subset 116, a similarity score can be assigned to a navigation bar element based on an amount of variation among the navigation bars in the resources in the subset 116, and so on.

When a similarity score for a region indicates a high degree of similarity among the resources in the subset 116 (e.g., the similarity exceeds a threshold level), the region may be designated as boilerplate content that should be omitted during transcoding. By contrast, when a similarity score for a region indicates a low degree of similarity among resources in the subset 116 (e.g., the similarity is less than a threshold level), and thus that the region is significantly different from corresponding regions of other resources in the subset 116, the region may be selected for inclusion during transcoding.

Referring again to FIG. 1, the analysis module 140 identifies commonalities among the renderings 131, 132. For example, the analysis module selects regions 141, 142 in the renderings 131, 132 for which assigned scores satisfy one or more criteria. The analysis module 140 compares the selected region 141 for one rendering 131 with the selected region 142 for another rendering 132. In the illustrated example, the analysis module 140 determines that, in each of the renderings 131, 132, content in a central region 141, 142 is selected and should be included in a transcoded resource. Based on this identified commonality, the analysis module 140 determines that content in this region should be included in transcoded resources generated for resources in the set 115.

In stage (E), the template generation module 150 generates a transcoding template 152 based on the analysis of the analysis module 140. The transcoding template 152 may indicate one or more portions of a resource to include in a transcoded version of the resource and/or one or more portions of a resource to exclude from a transcoded resource.

The transcoding template 152 may be generated based on identified commonalities among the renderings of the resources in the sample subset. In particular, the transcoding template 152 designates that content should be included in transcoded resources when scores assigned to multiple resources in the sample subset 116 indicate that the content satisfies criteria for inclusion in transcoded resources. Similarly, the transcoding template 152 may indicate content to exclude from a transcoded resource where scores assigned to multiple resources in the sample subset 116 indicate that an element or region should be excluded.

In state (F), the computing system 102 stores the transcoding template 152 on the one or more data storage devices 104. The transcoding template 152 may subsequently be used to generate transcoded resources for any of the resources in the set 115. In some implementations, data identifying the resources in the set 115 may be stored with, or as a part of, the transcoding template 152. In some implementations, a list of the resources in the set 115 is stored. In some implementations, the features of the URLs used to select the resources in the set 115 (e.g., a particular hostname or URL depth) is specified.

In some implementations, multiple different transcoding templates may be generated for different sets of resources in a single Internet domain. For example, one transcoding template may be generated for use in transcoding resources in one subdomain (e.g., "mail.example.com") and a different transcoding template may be generated for use in transcoding resources in another subdomain (e.g., "news.example.com").

Figure 3:
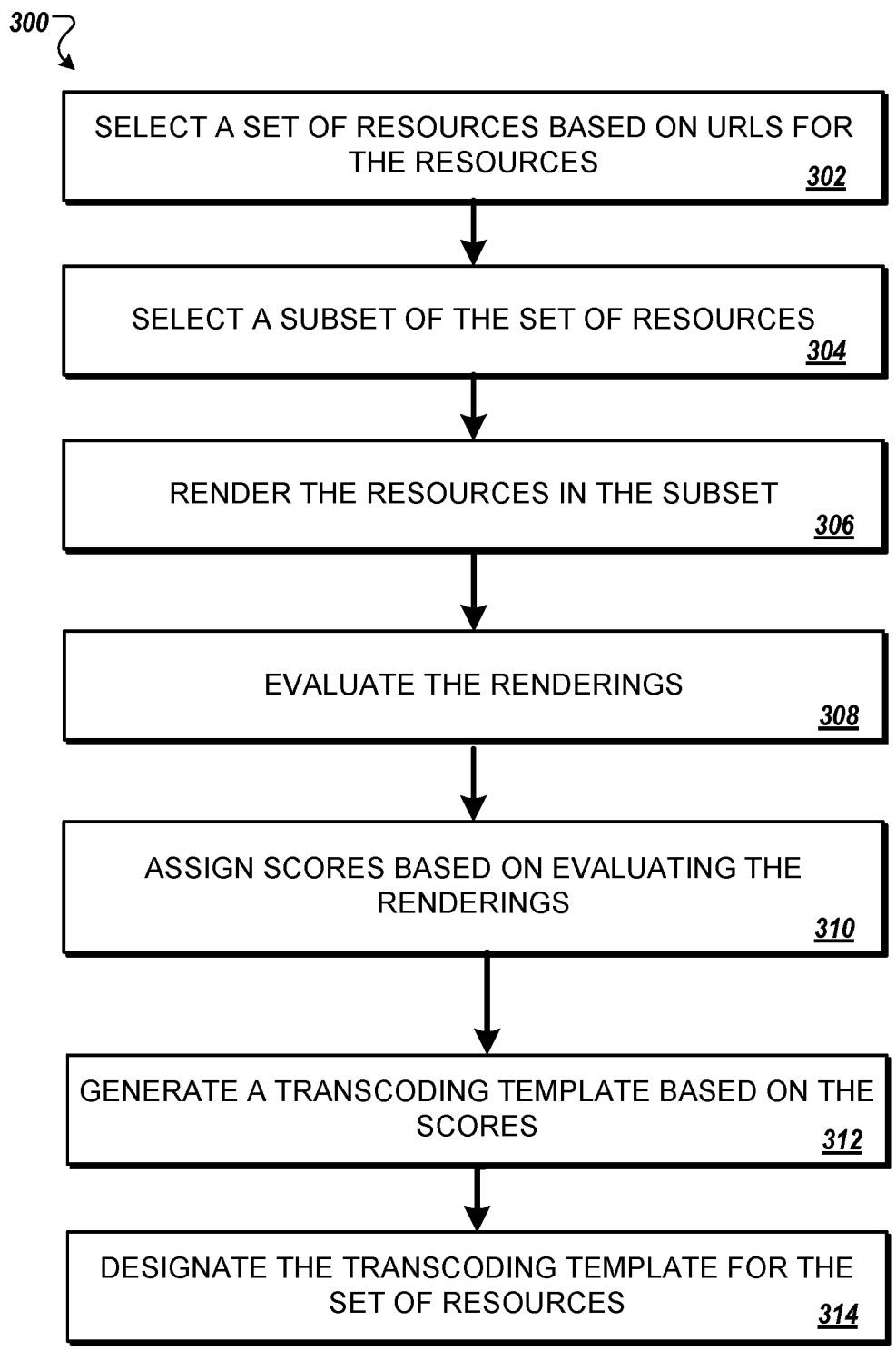
FIG. 3 is a flow diagram that illustrates an example of a process for generating a transcoding template.

FIG. 3 is a flow diagram that illustrates an example of a process 300 for generating a transcoding template. The process 300 is described as being performed by the computing system 102, but may be performed by other devices or systems.

The computing system 102 selects a set of resources based on URLs for the resources (302). For example, the set may be selected from among the resources in a particular Internet domain. The computing system 102 may determine a hostname and URL depth for the resources in the Internet domain, and select resources in the Internet domain that have the same hostname and/or URL depth.

The computing system 102 selects a subset of the resources in the set (304). For example, the computing system 102 may select fewer than all of the resources in the in the set. The computing system 102 may use any of various sampling techniques, including random or pseudo-random sampling to select the subset.

The computing system 102 renders each of the resources in the subset (306). For example, a layout engine may be used to process cascading style sheets (CSS) associated with each resource and generate a render tree for each resource.

The computing system 102 evaluates the renderings (308). For example, each of the render trees may be evaluated. In some implementations, interactive content in the rendering is identified, and a spatial distribution of the interactive content within the rendering is evaluated.

In some implementations, a text style is determined for each of multiple portions of a rendering. For example, the size, font, color, emphasis, and/or other characteristics of the rendered text in different regions of the renderings may be determined. Differences among the determined text styles are evaluated. For example, differences between adjacent regions in the rendering may be evaluated. As another example, an amount of variation within a region, such as a number of different text styles within a region, may be evaluated. Similarly, a number of text styles in different regions of a rendering, or an amount of difference between text styles in different regions of a rendering may be determined.

The computing system 102 assigns scores to different portions of the resources based on evaluating the renderings (310). For example, the computing system 102 may determine an interactivity score for a region of the rendering based on an amount of area in the region that responds to user interaction.

As another example, text scores may be assigned to a region of a rendering based on the variation in text styles within the region or the variation in text style between the region and one or more adjacent regions. To determine an interactivity score, a fraction of a number of pixels in the region that respond to user interaction out of a total number of pixels in the region may be determined, and the interactivity score can be a function of this fraction.

In some implementations, the computing system 102 also compares the renderings to identify differences among the content of the corresponding document elements. The computing system 102 assigns a similarity score based on the similarity of the content among corresponding portions of the resources.

The computing system 102 generates a transcoding template based on the assigned scores (312). For example, the transcoding template may indicate content to include in a transcoded resource when transcoding a resource in the set of resources. The transcoding template may indicate content to exclude from a transcoded resource in the set of resources.

To generate the transcoding template, the computing system 102 may determine whether the assigned scores satisfy one or more thresholds. The computing system may determine that, for each of at least a threshold number of the resources in the sample subset, the content that displays in a particular region of a rendering has been assigned a score that satisfies a threshold. In response to the determination, the transcoding template may indicate that content that display in that region should be included in transcoded resources. In some implementations, the transcoding template indicates that content should be included only when corresponding content of at least a minimum number of resources has been assigned a score that satisfies a threshold.

In some implementations, the computing system 102 selects content of the resources based on the scores. For example, for each resource in the subset, content that satisfies one or more criteria may be selected. Selecting content of the resource based on evaluating the rendering includes selecting the region based on determining that the interactivity score satisfies the interactivity threshold. For example, content corresponding to a region of a rendering may be selected based on determining that the fraction of pixels that are interactive is less than a corresponding threshold value. In some implementations, a region is selected based on a text score for the region satisfying a text score threshold indicating a maximum amount of text style variation. In some implementations, a region is selected based on a similarity score for the region that indicates a level of similarity of the content with corresponding elements of other renderings. A region may be selected when, for example, the similarity score indicates that the content in the region is different from the content in corresponding regions of other resources in the subset 116 by at least a threshold amount.

In some implementations, the computing system 102 identifies commonalities among the selected content of the respective resources in the subset. For example, the computing system 102 identifies regions that are selected in each of several renderings as satisfying appropriate thresholds for interactivity scores, text scores, similarity scores, or other scores. For example, the computing system 102 may determine that corresponding portions of each of multiple of the resources in the subset are selected. The corresponding portions may be content that is located at the same location in renderings, or content corresponding to the same elements of a render tree or DOM tree.

The computing system 102 designates the transcoding template for use when transcoding a resource in the set of resources (314). The transcoding template may be stored for later use. In some implementations, the transcoding template indicates important content that should be included in a transcoded resource more precisely than analysis of a single resource. In addition, the transcoding template permits information about renderings of some resources to be applied to a larger set of resources. In this manner, information about renderings is used in the transcoding process, without requiring each resource to be rendered.

Figure 4:
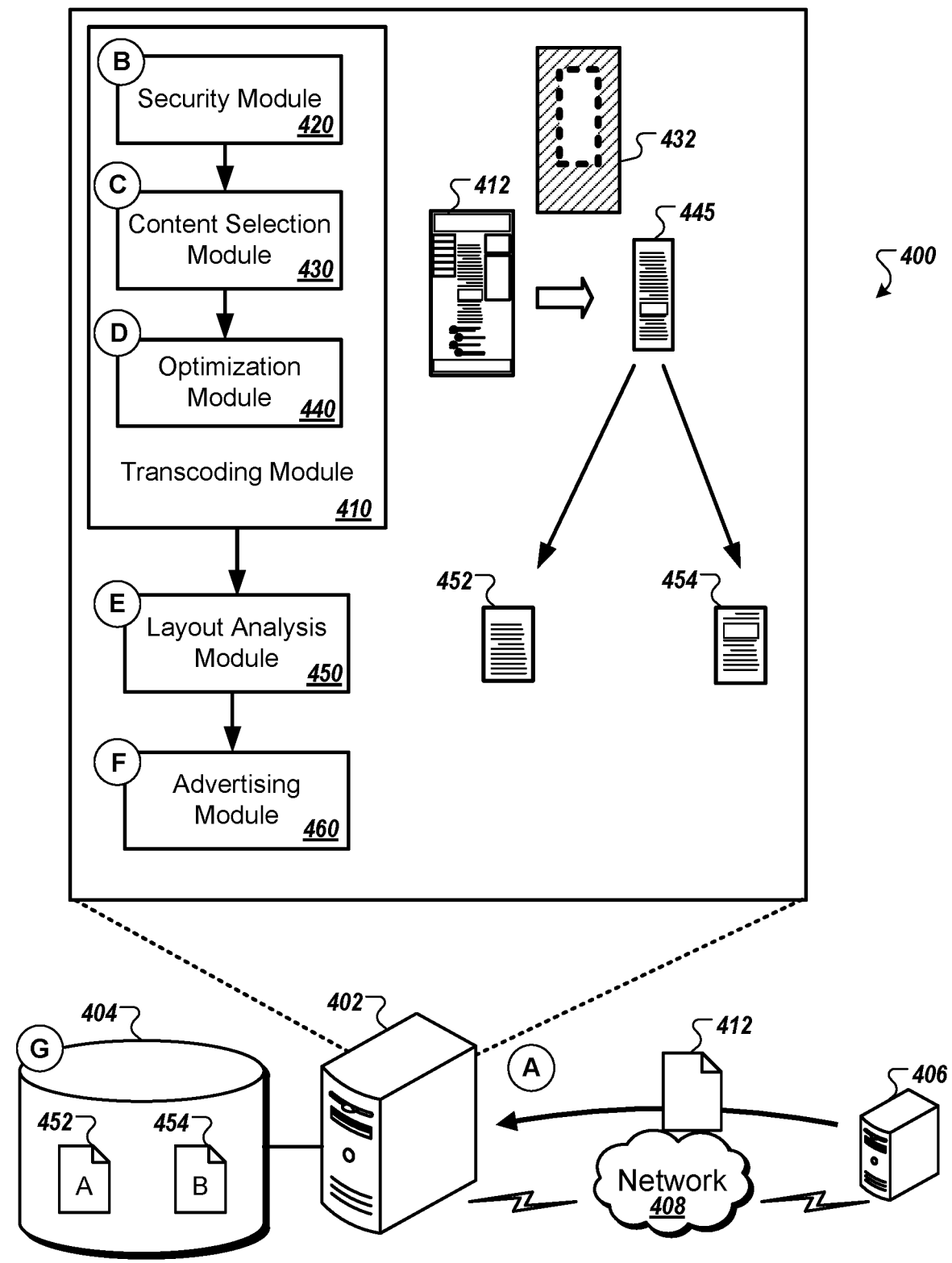
FIG. 4 is a diagram that illustrates an example of a system for transcoding resources.

FIG. 4 is a diagram that illustrates an example of a system 400 for transcoding resources. The system 400 includes a computing system 402 that communicates with one or more data storage devices 404. The computing system 402 includes a transcoding module 410, which includes a security module 420, a content selection module 430, and an optimization module 440. The computing system 402 also includes a layout analysis module 450 and an advertising module 460. The computing system 402 communicates with a server 406 over a network 408. The diagram shows stages (A) to (G), which illustrate a flow of data, and which may occur in the sequence illustrated or in a different sequence.

Briefly, the computing system 402 transcodes resources, for example, to prepare portions of the resources to be embedded in (e.g., provided within and as a part of) search results pages. The computing system 402 may use a transcoding template to select content to include in a transcoded resource (e.g., a transcoded version of the resource). When generating the transcoded resource, the computing system 402 may apply a different set of transcoding parameters or transcoding rules to generate an ATF portion and a BTF portion of the transcoded resource. The computing system 402 stores the transcoded resource, and distinguishes the ATF portion from the BTF portion. For example, the ATF portion and the BTF portion may be stored in a manner that the ATF portion and BTF portion can be identified and served by different server systems.

In some implementations, content of a resource is obtained. The resource is associated with a URL and a domain. A transcoding template is selected based on the URL of the resource. The selected template can be a template generated based on renderings of multiple other resources in the domain. A subset of the content of the resource is selected based on the selected transcoding template. A transcoded resource that includes the selected subset of the content is generated. Above-the-fold content of the transcoded resource is identified. The transcoded resource is stored and the above-the-fold content of the resource is designated.

In further detail, in stage (A), the computing system 402 obtains content of a resource 412. For example, the computing system 402 receives the resource 412 over the network 408.

Transcoding the resource 412 may include multiple actions, which may be performed in the order illustrated or in a different order. To transcode the resource 412, the security module 420 can include applying security policies, the content selection module 430 can select a subset of the content of the resource 412 to include in a transcoded resource 445, and the optimization module 440 can optimize various aspects of the transcoded resource 445.

In stage (B), the security module 420 assesses the resource 412 and applies security policies. For example, the security module 420 may examine the resource 412 and identify content that is interpretable, executable, or otherwise invocable. For example, the security module 420 identifies Javascript code in the resource 412.

In some implementations, when Javascript code or other invocable content is identified, the security module compares the functions invoked by the content to a defined set of functions that are designated as safe. Content that invokes only functions designated as safe is retained, while content that invokes functions that are not designated as safe is removed. As an example, Javascript code that invokes standard functions for expanding and collapsing sections of a document may be designated as safe, and may therefore be retained in the transcoded resource 445. However, Javascript code that invokes other functions may be excluded from the transcoded resource 445.

When content invokes functions that are not designated as safe, the security module 420 may determine one or more features of the content, and replace the unsafe content with content that reproduces the features. For example, in some instances, Javascript code may be replaced by HTML and CSS content. As an example, the Javascript code:

<div onclick="document.location.href='/a.html';">TEXT</div> may be replaced by the HTML code:

<a style="display:block" href="/a.html">TEXT</a>.

The security module 420 may also introduce features to avoid or limit the effectiveness of password phishing. For example, URLs in the resource 412 that reference images may be rewritten to reference the images through a proxy. In addition, content can be included in the transcoded resource 445 to detect a condition that causes an input field to be presented on a user interface. For example, code can be included to detect conditions that would result in a 401 WWW-Authenticate prompt or other password prompt being presented to a user. Content is included in the transcoded resource 445 so that when the input field is displayed, a message accompanying the input field is also displayed. The message can be a warning or a disclaimer that is not provided when the input field is presented on the resource 412. For example, the message can clarify that the input field is not associated with the search engine home page or the domain that serves the transcoded resource 445.

In stage (C), the content selection module 430 selects a transcoding template 432 based on a URL of the resource 412. For example, the content selection module 430 examines the URL for the resource 412 to identify a hostname and URL depth, and selects the transcoding template 432 indicated to correspond to resources with the hostname and/or URL depth.

The content selection module 430 uses the transcoding template 432 to select content of the resource 412 to include in the transcoded resource 445. The transcoding template 432 may indicate portions of the resource 412 to include in the transcoded resource 445 and/or portions of the resource 412 to exclude from the transcoded resource 445.

In stage (D), the optimization module 440 examines the selected content and modifies the content according to one or more optimization criteria. The optimization module 440 may alter the content of the resource 412 to improve presentation on mobile devices. For example, elements that have a width that exceeds a threshold can be resized to fit within the threshold. In addition, the optimization module 440 can identify one or more elements that have an absolute position property or fixed position property. The optimization module 440 can then include the one or more elements in the transcoded resource 445 with a static position property. Typically, elements with a static property are rendered in the order that the element appears in the document flow. By contrast, elements with an absolute positioning property are positioned relative to an earlier non-static ancestor element. Elements with a fixed positioning property are typically positioned relative to a browser window.

The optimization module 440 also optimizes the content of the resource 412 to reduce the file size for transfer and the computational cost for rendering the resource. For example, the optimization module may determine that one or more elements of the resource 412 do not affect the visual appearance of a rendering of the resource. The optimization module generates the transcoded resource 445 to exclude the elements determined to not affect the visual appearance of the rendering.

In some implementations, the optimization module identifies elements of the resource 412 that have inline style attributes, and determines that the inline style attributes for multiple of the elements have at least a threshold level of similarity. The optimization module then includes the elements in the transcoded resource 445 with a single style definition for the plurality of the elements, without including the inline style attributes.

In some implementations, the optimization module 440 identifies an image an image referenced by (e.g., linked to) the resource 412. The optimization module 440 determining a size of the image (e.g., pixel size or file size) and determines that the size satisfies a size threshold. For example, the optimization module 440 determines that the size is less than a maximum size. The optimization module 440 also determines an update frequency for the image, and determines that the update frequency satisfies an update frequency threshold. For example, the optimization module 440 determines that the update frequency is greater than a minimum frequency (e.g., image is changed no more than once per day, or once per week, etc.). Based on determining that the size satisfies the size threshold and the update frequency satisfies the update frequency threshold, the optimization module embeds the image within the transcoded resource 445, for example, as an encoded object. Because the content of the image is included within the transcoded resource 445, a client device rendering the transcoded resource 445 does not need to request or wait for the image to be downloaded separately.

In some implementations, variable names in the resource 412 are replaced with shorter variable names in the transcoded resource 445. In some implementations, the optimization module 440 identifies non-mandatory whitespace in the resource 412 and excludes the identified non-mandatory whitespace from the transcoded resource 445.

In stage (E), the layout analysis module 450 identifies an above-the-fold (ATF) portion 452 of the transcoded resource 445. Typically, the "fold" refers to an edge or boundary of a display area in which a resource is displayed, such as the bottom edge of the display area. When a resource is displayed in a web browser, the resource typically extends beyond the initial viewing area of a web browser, and the user must typically scroll or otherwise navigate within the resource to reveal content not initially presented in the display area.

The portion of a resource that is initially viewable within the browser on the user's display is referred to as the ATF portion of the resource. For example, the ATF portion can be the portion of a resource shown in a display area after the resource is rendered and displayed, before the user scrolls to reveal additional content. The remainder of the resource, which typically may be revealed by scrolling downward within the browser, is referred to as a below-the-fold (BTF)

portion of the resource. The ATF portion may exclude portions of the transcoded resource 445 that extend beyond the display area by more than a defined amount. The ATF portion may be defined to exclude any portion of the resource that extends beyond the display area.

In some implementations, the ATF portion 452 includes that provides an initial view of the transcoded resource 445. The ATF portion 452 can be content that corresponds to a top-most portion of a rendering of the transcoded resource 445, for example, a top page or region of the transcoded resource that fills a display area.

In some implementations, the ATF portion corresponds to content that is displayable in a defined amount of pixels on a display. For example, the ATF portion 452 may include content that, when rendered, is displayed in a region of a particular pixel size, or in a region within a particular range of pixel sizes. For example, the ATF portion 452 may include content that is when rendered has a height of, for example, 480 pixels, 960 pixels, 1080 pixels, or another other predetermined height. Other content may be excluded. Similarly, the ATF portion may include content that when rendered has a height between a range of heights, for example, a height between 480 and 960 pixels.

In some implementations, the ATF portion 452 may include a designated amount of text content. For example, the ATF portion 452 may be defined to include up to a maximum number of characters or words of the transcoded resource 445.

The ATF portion 452 can be defined to include content that fills a display area (e.g., web browser window or region) without including content to fill the display area twice. In other words, the ATF portion 452 may fill the display area once but not more than once. While content of the ATF portion 452 may extend below the fold somewhat, the content does not provide a complete view of the region below the initial view. In some implementations, content of a resource can be considered to have distinct, non-overlapping pages, where each page fills a display area. The ATF portion 452 can include at least the first page, but less than the first two full pages of the resource.

In some implementations, the ATF portion 452 is identified for a particular device and configuration. In other implementations, the ATF portion 452 is identified based on typical characteristics of devices in a class. For example, mobile phones may have significant variation in screen size, screen resolution, magnification properties, and other factors that may affect the amount of content that fits in a display region at a single time. The ATF portion 452 can be determined to fill a typical display area of devices of a class (e.g., smartphones, tablets, etc.), although the ATF portion 452 may end somewhat above or below the actual edge of the display area when actually displayed on some client devices. In some implementations, the ATF portion 452 is selected based on characteristics of the device with the largest screen and/or highest screen resolution in a class of devices, for example, to ensure that the ATF portion 452 provides at least one complete view of the transcoded resource 445.

The layout analysis module 450 identifies an ATF portion 452 of the transcoded resource 445 by, for example, selecting an amount of content that satisfies one or more predetermined constraints. For example, the layout analysis module 450 identifies content of the transcoded resource 445 that includes at least a minimum amount of content or fills at least a minimum display area, but does not exceed a maximum amount of content or fill more than a maximum display area. The layout analysis module 450 may identify the ATF portion 452 based on the content of the transcoded resource 445, for example, by examining a DOM tree for the transcoded resource 445 or analyzing the transcoded resource 445 directly. In some implementations, the layout analysis module 450 may render the transcoded resource 445 and examine the rendering.

Figure 5:
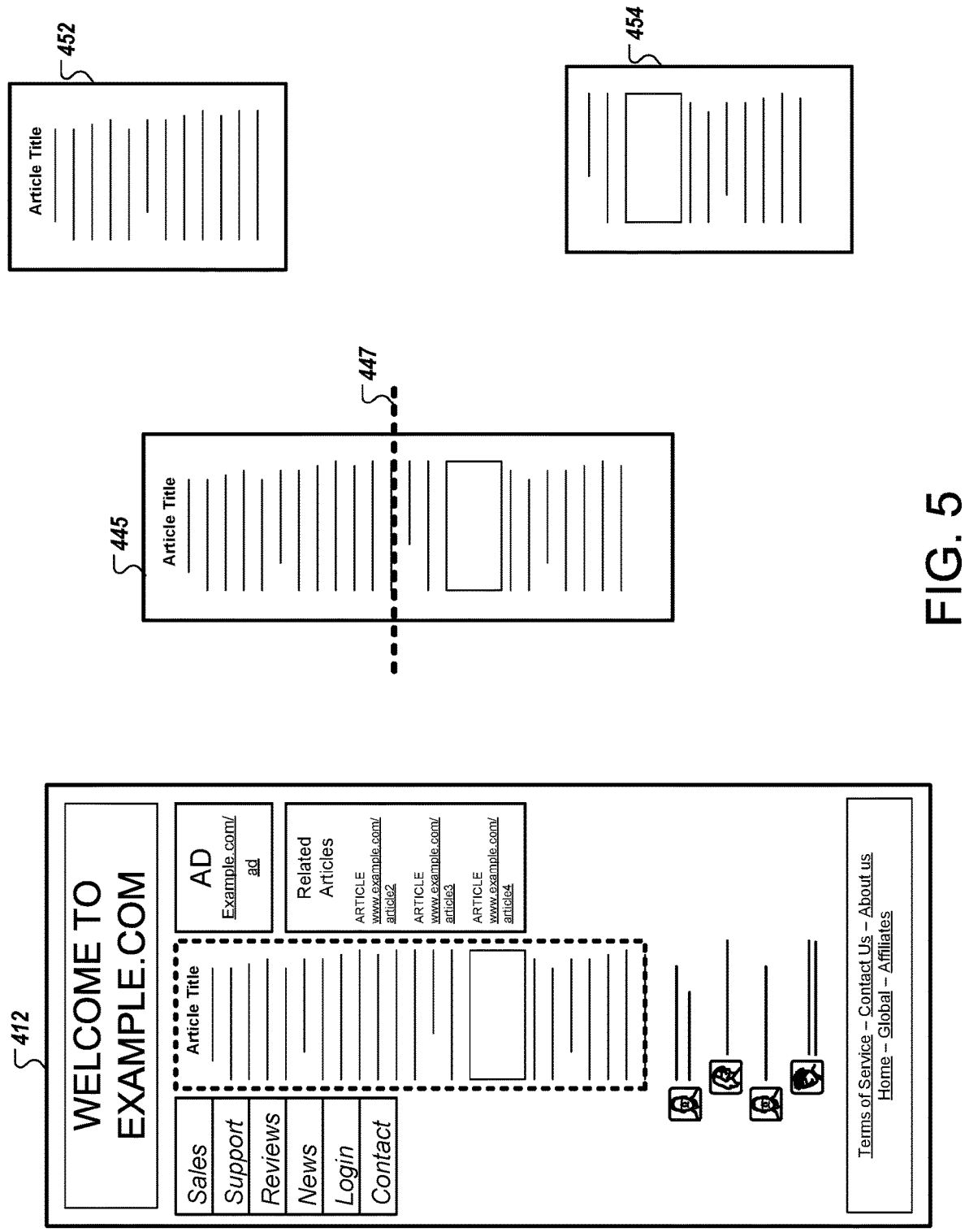
FIG. 5 is a diagram that illustrates an example of a resource and a transcoded resource.

FIG. 5 is a diagram that illustrates an example of the resource 412 and the transcoded resource 445. As illustrated, the transcoded resource 445 includes a subset of the displayable content of the resource 412. The layout analysis module 450 identifies a boundary 447 of a display area or a "fold" line for a display area in which the transcoded resource 445 is likely to be displayed. Content of the transcoded resource 445 that is estimated to be displayed in the display area above the boundary 447 is designated as the ATF portion 452, and content that of the transcoded resource 445 that is estimated to be displayed a display area below the boundary 447 is designated as the BTF portion 454

Referring again to FIG. 1, in some implementations, when the ATF portion 452 and BTF portion 454 are identified, the transcoding module 410 may process the ATF portion 452 and BTF portion 454 according to different transcoding parameters. For example, the transcoding module 410 may strip all Javascript content from the ATF portion 452, but permit Javascript content to be retained in the BTF portion 454.

In stage (F), the advertising module 460 determines whether to include one or more advertisements in the transcoded resource, and what types of advertisements should be included. The advertisement module 460 then includes appropriate advertising content in the BTF portion 454 of the resource.

For example, the advertising module 460 may access data indicating a preference of the content provider about whether advertisements should be provided and which source the advertisements should be selected from. The advertising module may determine the manner in which to display the advertisement, for example, in a persistent display area that remains visible as a user scrolls, or as a portion of the document that scrolls with other content of the resource. The advertising module then includes in the BTF portion 454 content that, when processed, obtains and displays an advertisement, and the particular advertisement may be dynamically determined by a server system at the time the transcoded resource 445 is displayed.

In stage (G), the computing system 402 stores the transcoded resource 445. The computing system 402 stores the transcoded resource 445 in a manner that designates the content that is included in the identified ATF portion 452. For example, the computing system 402 distinguishes the ATF portion 452 from the BTF portion 454. The computing system 402 may store data identifying the content that is included in the ATF portion 452. In some implementations, the ATF portion is stored separately from the BTF portion 454, for example, as a different file, on a different server or data storage device, or as a distinct entry or portion of a data structure. The ATF portion 452 and BTF portion 454 may be stored as standalone resources that may be rendered and displayed independently.

In some implementations, the computing system 402 stores the transcoded resource 445 as HTML and CSS, or other code that is renderable by a web browser, rather than as an image. For example, the actual transcoded resource 445 is stored, rather than an image or view of the transcoded resource 445.

Figure 6:
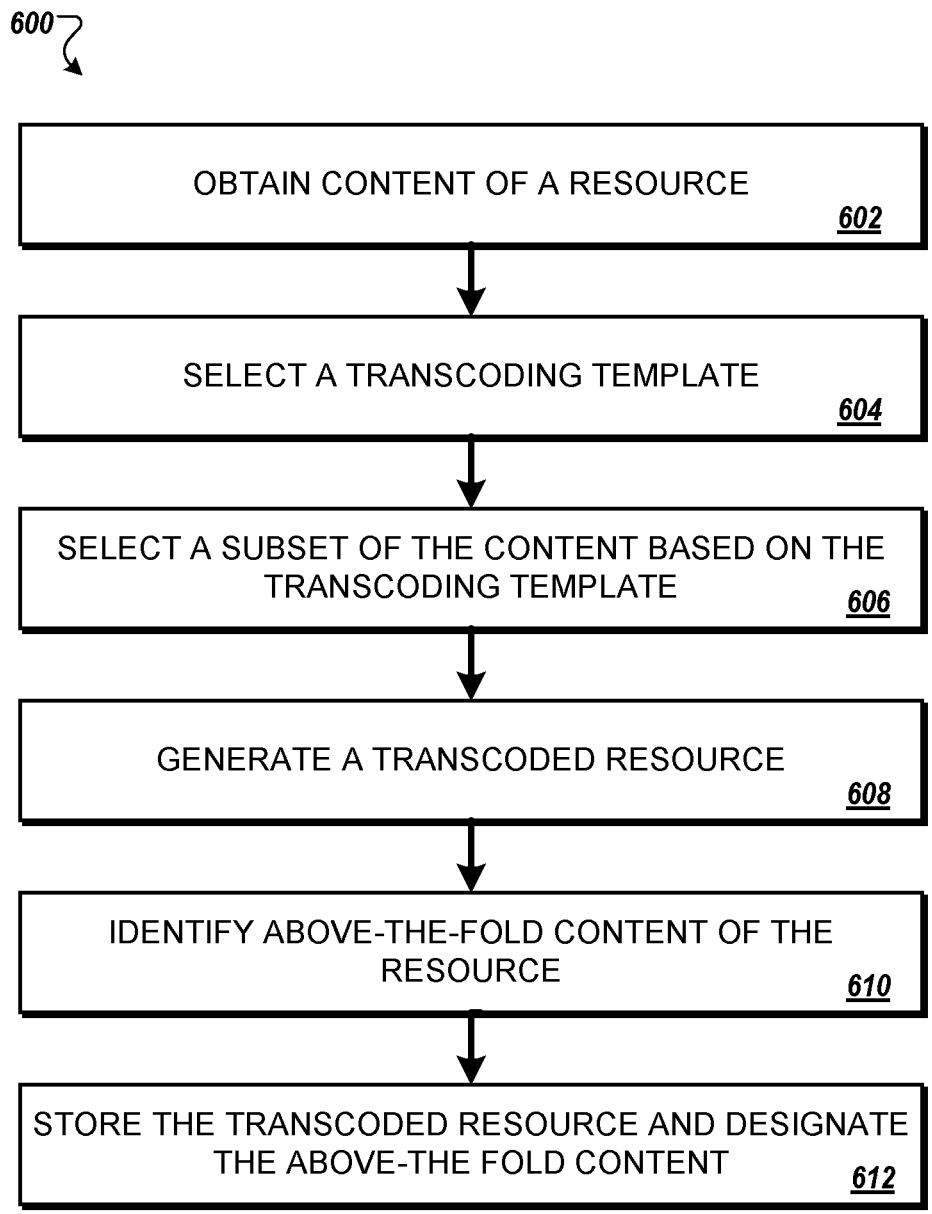
FIG. 6 is a flow diagram that illustrates an example of a process for transcoding a resource.

FIG. 6 is a flow diagram that illustrates an example of a process 600 for transcoding a resource. The process 300 is described as being performed by the computing system 402, but may be performed by other devices or systems.

The computing system 402 obtains content of a resource (602). The resource is associated with a URL and a domain. The computing system 402 selects a transcoding template based on the URL associated with the resource (604). For example, the computing system 402 selects a transcoding template generated based on renderings of a plurality of other resources in the domain.

The computing system 402 selects a subset of the content of the resource based on the selected transcoding template (606). For example, the subset excludes one or more visually displayable portions of the resource.

The computing system 402 generates a transcoded resource that includes the selected subset of the content (608). In some implementations, the computing system 402 determines that the resource includes one or more elements that do not affect the visual appearance of a rendering of the resource, and generates the transcoded resource to exclude the one or more elements determined to not affect the visual appearance of the rendering.

In some implementations, the computing system 402 identifies elements of the resource that have inline style attributes, determines that the inline style attributes for a plurality of the elements have at least a threshold level of similarity, and includes in the transcoded resource the plurality of the elements and a single style definition for the plurality of the elements. The inline style attributes corresponding to the plurality of the elements are not included.

In some implementations, the computing system 402 identifies an image referenced by the resource. The computing system 402 determines a size of the image, and determines that the size satisfies a size threshold. The computing system 402 determines an update frequency for the image and determines that the update frequency satisfies an update frequency threshold. Based on these determinations, the computing system 402 embeds the image within the transcoded resource, for example, so the image is transferred with and as a part of the transcoded resource rather than as a linked resource.

In some implementations, the computing system 402 includes variable names in the transcoded resource that are shorter than corresponding variable names in the resource. In some implementations, the computing system identifies non-mandatory whitespace in the resource and generating the transcoded resource to exclude the identified non-mandatory whitespace.

In some implementations, the computing system 402 identifies one or more user-submitted comments in the resource, and selects the subset of the content based on identifying the user-submitted comments. By default, comments may be excluded from the transcoded resource. However, a metadata value or other property may indicate that comments should be included, in which case the comments may be included in the transcoded resource.

In some implementations, the computing system 402 identifies one or more elements designated as having an absolute position property or fixed position property and includes the one or more elements in the transcoded resource with a static position property.

In some implementations, the computing system 402 identifies content in the resource that invokes one or more functions, determines whether the one or more functions are included in a defined set of functions, and selectively includes the content that invokes one or more functions in the transcoded resource based on determining whether the one or more functions are included in the defined set of functions. When a portion of the content does not invoke any functions that are not included in a set of functions classified as secure (e.g., only invokes functions in the defined set), the portion of the content may be included in the transcoded resource. When a portion of the content is determined to invoke a function that is not included in the set of functions classified as secure, the portion of the content may be excluded from the transcoded resource. In some implementations, the excluded portions, when invoked, produce a particular user-observable effect, and the transcoded resource is generated to include alternative content that, when processed, produces the same user-observable effect without invoking a function that is not designated as secure.

In some implementations, the computing system 402 includes code in the transcoded resource that, when rendered or invoked, is operable to detect a condition that causes an input field to be presented on a user interface and display a message accompanying the input field, where the message is not provided when the input field is presented based on the resource. For example, the transcoded resource may cause a client device to detect receipt of a request for authentication, such as an HTTP "401 Not Authorized" response code or a WWW-Authenticate HTTP header. The resource may cause a message to be displayed accompanying the input field, such as a warning or a disclaimer separate from an authentication prompt produced by a web browser.

In some implementations, an ATF portion of the transcoded resource is generated according to a first set of transcoding parameters, and the remainder of the transcoded resource, the BTF portion, is generated according to a second set of transcoding parameters different from the first set of transcoding parameters.

The computing system 402 identifies above-the-fold (ATF) content of the transcoded resource (610). The ATF content is the content of the ATF portion of the transcoded resource. The ATF content may include less than all of the content of the transcoded resource. For example, the ATF content excludes BTF content (e.g., content of the BTF portion of landing page.)

In some implementations, the computing system 402 identifies content that fills a defined display area. The ATF content can be content that, when displayed, fills at least a minimum display area. The ATF content can also be content that fills less than a maximum display area. The ATF content can be identified as content that includes a particular amount of text or fills a particular height of display area.

The computing system 402 stores the transcoded resource and designates the ATF content of the transcoded resource (612). In some implementations, the ATF content and BTF content are separated. For example, the ATF content and BTF content may be served from different servers or different domains.

Figure 7:
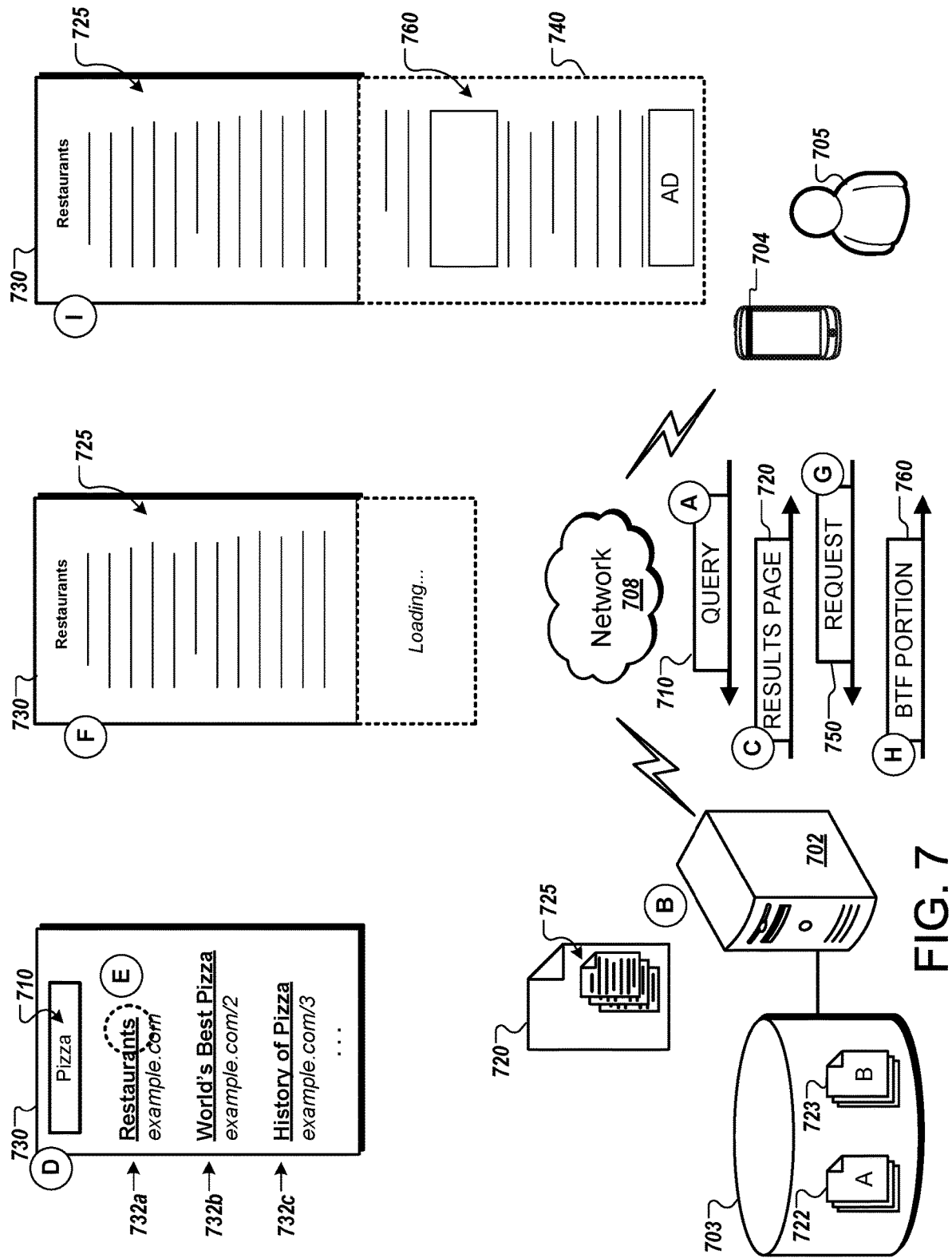
FIG. 7 is a diagram that illustrates an example of a system for providing search results.

FIG. 7 is a diagram that illustrates an example of a system 700 for providing search results. The system 700 includes a computing system 702 and a client device 704. The computing system 702 and the client device 704 communicate over a network 708. The computing system 702 also communicates with one or more data storage devices 703. The diagram shows stages (A) to (I), which illustrate various aspects of the system 700. Stages (A) to (C), (G) and (H) illustrate a flow of data, and which may occur in the sequence illustrated or in a different sequence. Stages (D) to (F) and (I) illustrate user interfaces and interactions with the user interfaces.

Briefly, the computing system 702 provides a resource, such as a search results page, that includes content of one or more landing pages corresponding to search results. The content of a landing page that is included in the search results page can be content that was designated as ATF content. The ATF content may provide a view of a contiguous (e.g., unbroken or uninterrupted) portion of a resource that fills a display area. When the search results page is displayed on a client device and a user interacts with a search result, the client device displays the ATF content included within the search results page, and the user perceives only a minimal amount of latency, if any, since the ATF content is already available and does not need to be obtained over a network. When the user interacts with the search result, the client device obtains the remainder of the landing page (e.g., the BTF content) and displays the remainder of the landing page below the ATF content. The ATF content and the remainder of the landing page may be presented seamlessly so that the user does not perceive that the two portions of the landing page were obtained at different times or from different servers or domains.

In some implementations, search results pages include embedded ATF content of landing pages when the query is received from a mobile device. The computing system 702 can determine that a query was sent by a device classified as a mobile device (e.g., a cellular phone, smartphone, etc.), and generate the search results page to include embedded ATF portions of landing pages in response to the determination. If a query is determined to have been received from a device that is not classified as a mobile device (e.g., a desktop computer), a different search results page may be generated and provided, such as a search results page that does not embed ATF portions of landing pages, or that embeds different content designated for the class of device from which the query was received. The computing system 702 may determine the type of device that provided a query by, for example, examining content from a client device, such as a user agent identifier in an HTTP header, or determining that the query was submitted over a cellular network or other mobile network.

In some implementations, the computing system 702 receives a query. The computing system 702 generates a resource and provides the resource in response to the query. The resource is generated so that, when processed by a client device, the resource causes the client device to perform various operations. For example, the operations include displaying a search result having an associated landing page and detecting user interaction with the search result. The operations also include, in response to detecting user interaction with the search result, displaying a first portion of the landing page that is embedded within the resource, and to request, over a network, a second portion of the landing page. The operations include receiving, the second portion of the landing page over the network and loading the second portion of the landing page.

In further detail, in stage (A), the client device 704 sends a query 710 to the computing system 702. The query 710 may include one or more query terms that indicate a topic of interest to the user 705 of the client device 704. In some implementations, the query 710 is transmitted over a wireless network connection, for example, a mobile phone communications network such as a second generation (2G) cellular network, a third generation (3G) cellular network, a fourth generation (4G) cellular network, a mobile WiMax network, a long term evolution (LTE) network, and so on. Any appropriate communication protocol can be used, including, for example, code division multiple access (CDMA), global system for mobile communications (GSM), High Speed Packet Access (HSPA), and so on. Other networking connections, such as wired connections and Wi-Fi, may also be used.

In stage (B), the computing system 702 generates a resource, such as a search results page 720. For example, the computing system 702 receives data identifying resources that are responsive to the query 710, for example, resources determined to be relevant to the query 710 by a search engine system. A set of resources, such as a predetermined number of the highest ranked resource, may be selected. The computing system 702 generates the search results page 720 to include a search result identifying each of the selected resources. Each search result may have a corresponding landing page, or a resource that a web browser navigates to in response to tapping, clicking, or otherwise interacting with the search result.

For each of the selected resources, the computing system 702 determines whether a transcoded resource (e.g., a transcoded version of the resource) is available. For example, the computing system 702 determines whether transcoded resources are available in a repository that includes transcoded resources for each of multiple Internet domains. If a transcoded resource is not available, the search result references (e.g., includes a link to) the version of the resource provided by the content provider.

If a transcoded resource is available, the computing system 702 generates the search result so that the transcoded resource is the landing page for the search result. For each of the search results that designates a transcoded resource as a landing page, the search results page 720 also includes the ATF portion of the landing page within the search results page 720. For example, the computing system 702 accesses a repository of transcoded resources stored on the one or more data storage devices 703. The repository can store the ATF portions 722 of a variety of different resources, including multiple transcoded resources for a particular domain and transcoded resources for multiple domains. In some implementations, transcoding to generate the transcoded resources in the repository (e.g., processing to generate the ATF portions 722) occurs before the query 710 is received by the computing system 702.

In the illustrated example, ATF portions 725 of multiple landing pages are embedded in the search results page 720. The embedded ATF portions 725 can be included in the search results page 720 as part of the search results page 720. For example, the ATF portions 725 can be contained within the search results page, rather than being linked to or referenced by the search results page 720. The search results page may be generated to include ATF portions 725 for landing pages corresponding to some or all of the search results. For example, an ATF portion 725 may be included for a landing page of only a highest-ranked search result. As another example, the search results page 720 may include the ATF portion 725 of landing pages only for a highest-ranked set of search results (e.g., the 3 or 5 highest-ranked search results indicated by the search results page 720), for at least half of the search results; or for all of the search results.

The ATF portion of a transcoded resource may be embedded in the search result page by, for example, including the HTML code or other content of the ATF portion as a Javascript string literal. In this manner, the content is included in the search results page 720, but is not initially rendered when a client device processes the search results page 720, thus reducing the amount of processing required to initially display the search results page 720. As another example, the content of the ATF portion may be encapsulated in a hidden element, such as a hidden <div> element, of the search results page 720. However, in some implementations, HTML content that is designated to be hidden may still be rendered when the search results page 720 is initially processed, even though the content is not displayed.

In some implementations, when the ATF portion of a landing page is included in the search results page 720, the remainder of the landing page (e.g., the BTF portion) is not included in the search results page 720. Excluding the BTF portion avoids unnecessarily increasing the size of the search results page. As a result, the file size of the search results page 720 is controlled to limit the delay and bandwidth needed to transfer the search results page 720. Since most users typically do not view every landing page referenced in a search results page, excluding BTF content avoids transferring large amounts of content that the user may not view. Nevertheless, because the ATF portions of landing pages are included, the latency to display an initial view of the page is low. For example, text content in the ATF portions may be presented with little or no perceived latency by the user 705. In some implementations, the responsiveness in displaying a landing page after interacting with a search result may approach or equal the responsiveness of a native application.

The search results page 720 is generated to cause a client device to perform a number of actions when the search results page 720 is processed, as discussed further below. Briefly, the search results page 720 causes a client device to display the embedded ATF content of a landing page when the corresponding search result is interacted with. The search results page 720 also causes a client device to obtain and display the remainder of the landing page.

In stage (C), the computing system 702 sends the search results page 720 to the client device 704 in response to the query 710. The embedded ATF portions 725 of landing pages are included in and transferred with the search results page 720. For example, the ATF portions 725 may be transferred in as a part of the same file as the search results page 720, or as part of the same network transfer that transfers the search results page 720. The search results page 720 may be provided to the client device 704 using any appropriate networking connection, including mobile phone wireless communications networks such as cellular networks and other networks and protocols described above.

In some implementations, both the search results page 720 and the embedded ATF portions 725 are transmitted in response to a single request (e.g., the query 710) from the client device 704. Because the data can be transferred in response to the single request, the client device 704 can receive the ATF portions 725 before processing the search results page 720, receiving user interaction with the search results page 720, or requesting data for the landing pages associated with the search results in the search results page 720.

In stage (D), the client device 704 processes and displays the search results page 720. The search results page 720 is displayed on a user interface 730 of the client device 704. In the illustrated example, search results 732*a*-732*c* are displayed. In some implementations, the ATF portions 725 of the landing pages corresponding to the search results 732*a*-732*c* are not processed (e.g., not rendered) when the search results page 720 is initially processed by the client device 704. As a result, the ATF portions 725 may be hidden from view when the search results page 720 is displayed.

For example, in some implementations, the search results 732*a*-732*c* (including the appropriate title, snippet, etc.) are displayed. However, in some implementations, no portion of any of the embedded ATF portions 725 is presented until the user 705 selects or otherwise interacts with the search result 732*a*-732*c*.

In stage (E), the user 705 of the client device 704 interacts with one of the search results 732*a*-732*c*. For example, the user 705 may tap, click, or otherwise interact with one of the search results 732*a*-732*c*. In the illustrated example, the user taps on the search result 732*a*. As described below, the user interaction triggers display of the ATF portion 725 of the landing page that is included in the search result page 720 and also triggers a request for the remainder of the landing page.

In stage (F), the client device 704 processes and displays an ATF portion 725 of the landing page corresponding to the search result 732*a* that was selected or interacted with by the user 705. Because the ATF portion 725 of the landing page was downloaded to the client device 704 as part of the search results page 720, the client device 704 displays the ATF portion 725 without incurring any latency on account of a network transfer. As noted above, the ATF portion 725 may fill a display area of a browser. The ATF portion 725 may display a continuous or non-interrupted region of the landing page, and may display the content at the top of the landing page. The ATF portion 725 can be content that was designated as corresponding to an above-the-fold view (e.g., by a computing system that generated the landing page), even if display of the ATF portion 725 on the client device 705 does not fill the display area or extends beyond a visible display area. In some implementations, the ATF portion 725 may include content for presenting an above-the-fold view that exactly fills the display area, without extending beyond the display area. After the search results page 720 is received, the client device 710 may display the ATF portion 725 before receiving any further information about the landing page.

In some implementations, the search results page 720 includes content that causes the ATF portion 725 to be displayed in the same browsing context as the search results page 720, without navigating away from the search results page 720. In some implementations, the ATF portion 725 may be displayed in the top-level browsing context. As an example, when the client device 704 detects interaction with the search result 732*a*, Javascript code of the search results page 720 causes the client device 704 to insert the ATF portion 725 into an element of the search results page 720. HTML code of the ATF portion 725, stored in a string, may be inserted using a Javascript "innerHTML" property. The ATF portion 725 may be set as the content corresponding to a "<div>" tag.

To reduce security risks of loading third-party content in the same browsing context as the results page, the ATF portion 725 may exclude invocable content (e.g., scripts and other interpretable or executable code), as discussed above. Thus the ATF portion 725 that is embedded within the search results page 725 is insulated from several security risks. For example, avoiding invocable code helps insulate cookies of the host domain to access by malicious code, which might otherwise have access in the top-level browsing context. As another example, the possibility for crashes, infinite loops, and other disturbances due to faulty or malicious scripts are avoided. Finally, without invocable code like Javascript code, the ATF portion 725 may be rendered very quickly by the client device 704, which contributes to a very low latency between interaction with the search result 732*a* by the user 705 and display of the ATF portion 725 of the landing page corresponding to the search result 732*a*.

In some implementations, the search results page 720 causes the client device 704 to display the ATF portion 725 with an animated effect, such as by sliding the ATF portion 725 into view over the initially displayed view of the search results page 720.

In addition to displaying the ATF portion 725, the search results page 720 also causes the client device 704 to create a page region 740 in which to display a second portion of the landing page. The page region 740 may be a dynamically generated inline frame, or "iFrame" in which to load the remainder (e.g., BTF portion) of the landing page. Since the user has indicated interest in the landing page by interacting with the search result 732a, there is a high likelihood that the user 705 will soon desire to view the BTF portion of the landing page.

The page region 740 can be located below the ATF portion 725, for example, as a seamless continuation of the displayed landing page. For example, the page region 740 can be positioned so that the BTF portion of the landing page is loaded below the ATF portion 725 in a manner that the landing page as a whole is presented without breaks or interruptions between the portions.

On initial display of the ATF portion 725, the page region 740 is hidden and represents an off-screen region of the landing page. In FIG. 7, the dashed lines around the page region 740 denote that the page region 740 is currently out of view of the user 740. In some implementations, the ATF portion 725 provides a full initial view of the landing page by filling the on-screen display region of a web browser. Typically, none of the page region 740 is viewed until the user 705 scrolls to reveal content beyond the initial view. Thus, since a full initial view of the landing page is presented, the user does not perceive that the entire landing page has not already been loaded. The delay between the user's interaction with the search result 732a and the first scroll action of the user 705 provides time in which the client device 704 may request, receive, and load the BTF portion in the page region 740. If the client device 704 loads the BTF portion before the user 704 scrolls to reveal more of the landing page, the delay in receiving and processing the BTF portion may be entirely hidden from the user 740.

In some implementations, the page region 740 (e.g., iFrame) presents content in browsing context different from the browsing context in which the ATF portion is displayed. By presenting the BTF portion in a different browsing context, security can be enhanced. For example, the page region 740 can be created with a "sandboxed" attribute so that the content loaded in the page region 740 is isolated from the content loaded in the parent browsing context (e.g., the search results page 720). In some implementations, the page region 740 presents content in the same browsing context in which the ATF portion is displayed.

In some implementations, the ATF portion 725 includes text-encoded content, such as text, HTML content or other markup language, text-based scripts, etc. The ATF portion 725 may include only text-encoded content, or may include a combination of text-encoded content and content encoded in other formats.

In some implementations, the ATF portion 725 includes content for producing all of the text presented to the user 705 in an above-the-fold view, which may be a view of the landing page that fills a display area of the client device 704 designated for display of the landing page. The view can present the top region landing page and/or the initial view of the landing page displayed to the user 705. The display area may be, for example, a window or region defined for display of the landing page by a web browser, or may be the entire screen of the client device 704.

In some implementations, the ATF portion 725 includes image data or other non-text items that are displayed in the above-the-fold view. As a result, processing the ATF portion 725 may images or other non-text items to be displayed in the above-the-fold view presented to the user 705, without receiving any additional portions of the landing page. In some implementations, the ATF portion 725 excludes one or more images or other non-text elements of the landing page that would be displayed in the above-the-fold view (e.g., top region) of the landing page. For example, the ATF portion 725 may present only text content of the landing page, or only text content and markup language content (e.g., HTML content such as borders, tables, etc.). In some implementations, while the text content in the ATF portion 725 is displayed, other content (such as linked images or advertisements not included in the ATF portion 725) may be transferred to the client device 704 over the network 708. These components may be displayed (e.g., added to the above-the-fold view already visible on the client device 704) as they are received and processed by the client device 704. The client device 710 may request non-text content that is excluded from the ATF portion 725 in response to processing the ATF portion 725 or other data in the search results page 720, which may indicate what additional components, if any, should be obtained.

During stage (G), the client device 704 sends a request 750 for the BTF portion of the landing page. The search results page 720 indicates the source from which to request the BTF portion. The BTF portion may be provided by the computing system 702 or another computing system. For example, the computing system 702 accesses the BTF portion from the repository of transcoded resources stored on the one or more data storage devices 703. The repository can store the BTF portions 723 of a variety of different transcoded resources corresponding to resources in multiple different domains.

In some implementations, the BTF portion is served from an Internet domain that is different from the Internet domain of the search results page 720. The BTF portion may be accessed from a repository or storage device different from the repository or storage device storing the ATF portions 722.

During stage (H), the client device 704 receives the requested BTF portion 760 of the landing page. The BTF portion 760 maybe received as an HTML document. The client device 704 processes the BTF portion 760, for example, rendering the BTF portion with a layout engine. The BTF portion 760 may include Javascript code or other invocable content, which may have been generated by a third party.

During stage (I), the client device 704 loads the BTF portion 760 in the page region 740. The page region 740 is off-screen, out of view of the user 705, until the user scrolls to bring the page region 740 into view. The ATF portion 725 and the BTF portion 760 together present the full landing page (e.g., the transcoded resource corresponding to the search result 732a). When the client device 704 completes loading of the BTF portion 760 before the user scrolls, the latency of obtaining and processing the BTF portion 760 may be entirely masked from the user 705. The landing page may appear to the user 705 be a single continuous page, even though portions of the landing page are obtained at different times, and from different servers or Internet domains.

In some implementations, the search results page 720 causes a control (e.g., button, link, etc.) for returning to the view of the search results 732a-732c shown for stage. The control can be is displayed along with the landing page. As noted above, the landing page may be displayed without navigating away from the search results page 720. Accordingly, the user 705 may switch quickly between views of the search results 732a-732c and the landing page.

In some implementations, the ATF portion 725 and BTF portion 760 are HTML documents rather than, for example, image representations of the landing page. By providing the ATF portion 725 and BTF portion 760 in this manner, the interactivity of the landing page may be preserved. For example, the user may expand and collapse sections, interact with links and other controls in the landing page, and perform other otherwise interact with the landing page in ways that an image would not permit. The BTF portion 760 may include Javascript content, permitting much of or all of the interactivity intended for the resource by the content provider.

Although the example of FIG. 7 shows a search results page having embedded portions of landing pages, resources other than search results pages may additionally or alternatively be provided with embedded portions of landing pages or other resources. In the same manner that a portion of a landing page may be included in a search results page and accessed by a user, a portion of a resource may be included in and accessed through a document that provides one or more of, blog posts, news content, social media information, maps, videos, audio, electronic books, electronic mail messages, electronic coupons, shopping information or shopping interfaces, or other content, in addition to or instead of search results.

In general, any document that includes a link or other reference to a resource may include a portion of the referenced resource embedded within the document. The document may be generated so that, when the document is displayed by a client device, the embedded portion is hidden from view, for example, hidden until a user interacts with a link or provides other user input. In response to user input, the document may cause a client device to display the embedded portion, and to retrieve and display portions of the referenced resource that were not embedded.

In addition, although the example of FIG. 7 shows a resource provided in response to the query 710, resources having embedded portions of landing pages can be provided in response to other data, events, or conditions. For example, a resource that includes above-the-fold content of a linked resource may be provided in response to any appropriate user data, such as user input, a request for a resource, or data indicating a location or preference of a user. Such a resource may be provided in response to an event, such as reaching the end of playback of video or audio, receipt of an e-mail message, or the occurrence of another predetermined event.

FIGS. 8A and 8B are diagrams illustrating examples of an advertisement 830. As illustrated, a client device 802 has loaded an ATF portion 810 and a BTF portion 820 of a landing page. The advertisement 830 is presented in a persistent region of a display, for example, at an edge 806 of a browser display area 804 that is visible on a screen of the client device 802. The advertisement 830 remains in the same position on the screen (e.g., "sticks" to the edge 806) as a user of the client device 802 scrolls up and down. As shown in FIG. 8B, as the user scrolls down, and part of the ATF portion 810 and part of the BTF portion 820 are visible on the screen, the advertisement 830 remains in the same position. The content of the advertisement 830 may be changed (e.g., replaced) from time to time.

In some implementations, content of advertisements is provided only through the BTF portion 820, with the BTF portion 820 being loaded in a sandboxed iFrame to limit security risks due to third-party content. To display advertisements from third-party providers in the ATF portion, advertisement content received through the sandboxed iFrame may be passed to the parent browsing context, in which the ATF portion 810 is displayed, through a postmessage. When the BTF portion 820 loads, the BTF portion notifies the parent frame of the advertising content, and the parent frame displays the advertisement 830 in the parent frame.

In some implementations, advertisements have a fixed position relative to the content of the landing page. For example, the advertisements may scroll with the content of the landing page rather than remaining in a persistent area. In such implementations, the landing page may adjust the viewed position of the landing page so that the advertisement is completely displayed. For example, when a user's scroll action positions an advertisement partially within and partially outside of a viewable area, content of the landing page may cause the client device 802 to scroll up or down so that the complete advertisement is within the viewable area. For example, the viewable content may "snap" to a predetermined position to enforce predetermined boundaries for viewing regions of the landing page.

FIG. 8C is a diagram illustrating an examples of advertisements 870, 871 in a landing page 850. In some implementations, the landing page 850 is divided into distinct views, for example, paginated into separate pages. Rather than incrementally scrolling through the landing page 850, the different views are displayed one at a time. For example, a first view 860 that fills a browser display area is replaced by a second view 861 that fills the browser display area, where the first view and the second view do not display overlapping regions of the landing page. An ATF portion of the landing page 850 may be the content providing the first page or view, and a BTF portion may include content for providing one or more subsequent views.

Advertisements 870, 871 may be located within one or more of the different views 860, 861. In some implementations, the advertisements 870, 871 are located in the same screen location in each view 860, 861, and in other implementations the advertisements 870, 871 are located at different locations in different views 860, 861.

In some implementations, advertisements are displayed in a browsing context different from the browsing context of the search results page also different from the browsing context of the BTF portion of a landing page. For example, an advertisement may be loaded in an inline frame within the inline frame in which the BTF portion is loaded.

Figure 9:
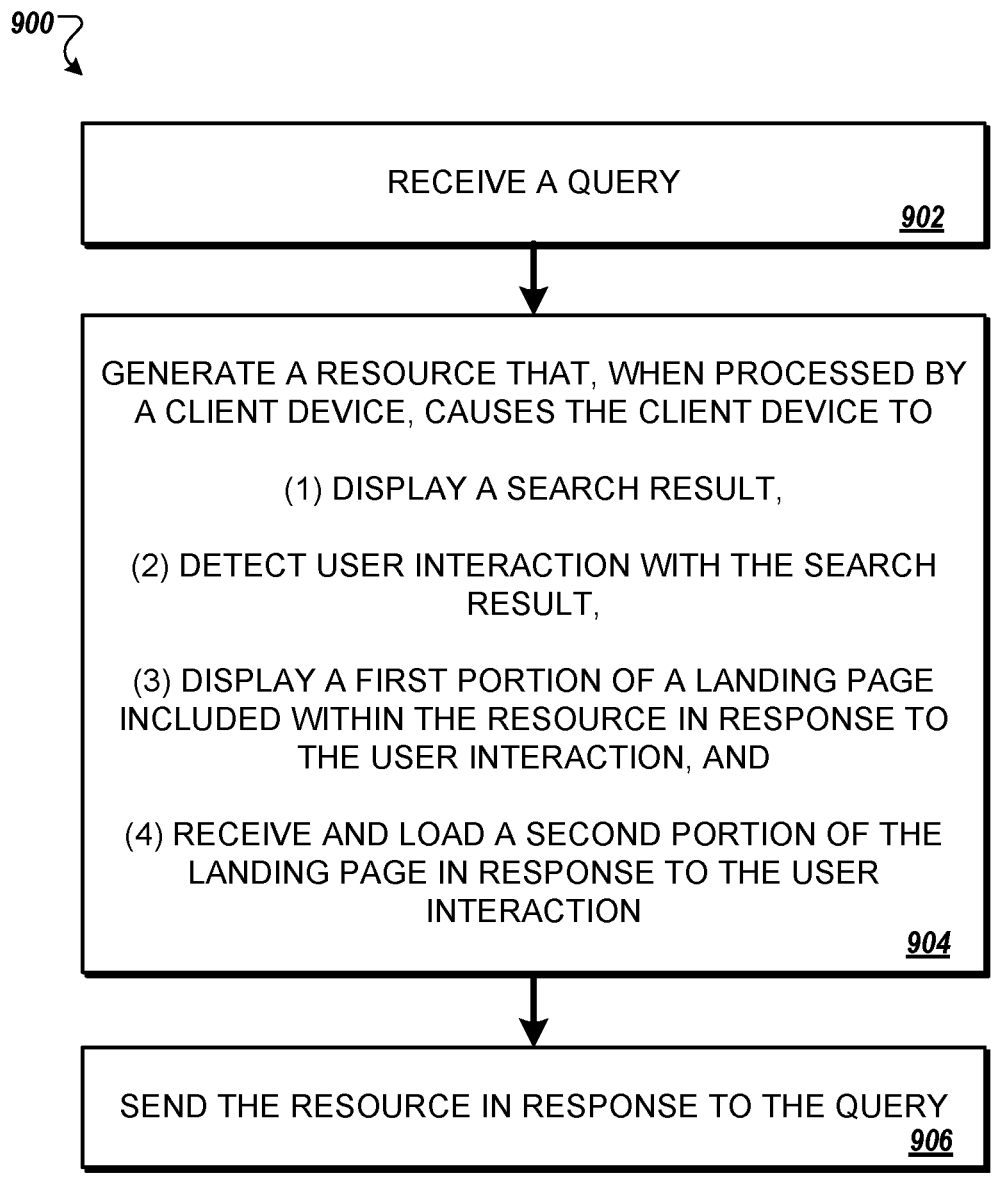
FIG. 9 is a flow diagram that illustrates an example of a process for providing search results.

FIG. 9 is a flow diagram that illustrates an example of a process for providing search results. The process 900 is described as being performed by the computing system 702, but may be performed by other devices or systems.

The computing system 702 receives a query (902). For example, the computing system 702 may receive the query from a mobile device, such as a smartphone or tablet computer. The computing system 702 may receive data identifying resources that are responsive to the query, for example, resources that are determined to be relevant to the query by the computing system 702 or another search engine system.

The computing system 702 generates a resource (904). The computing system 702 provides the generated resource in response to the query (906). The generated resource may be a search results page. The generated resource includes one or more search results that each reference a landing page. The landing pages may be transcoded versions of resources provided by content providers.

The resource includes a first portion of a landing page associated with one of the search results. The resource may be generated such that the first portion of the landing page is included in the resource as part of the resource. As a result, the first portion of the resource is transferred to the client device when the resource is transferred to the client device. The resource may include the first portion of the landing page as a string within the resource (e.g., with the first portion stored as text of a string literal). The resource may include a first portion of multiple different landing pages, associated with different search results.

To generate the resource, the computing system 702 may determine whether a transcoded resource is available for each of a set of resources that are responsive to the query. When a transcoded resource is available for one of the resources in the set, the computing system 702 includes a search result that references the transcoded resource as a landing page. The computing system 702 accesses a first portion of the transcoded resource and includes the first portion in the generated resource. For example, the first portion of the transcoded resource can be a portion designated as an above-the-fold (ATF) portion of the transcoded resource. The ATF portion can be an HTML or other text representation of content of the transcoded resource.

The computing system 702 generates the resource so that when the resource is processed by a client device, the resource causes the client device to perform several actions. For example, the resource may include HTML code, Javascript code, or other renderable or invocable content that causes the client device to perform the actions. The resource, when processed, causes the client device to display a search result that has an associated landing page. The resource includes the data that identifies the search result and the associated landing page, permitting the search result to be displayed without transferring additional data over a network. The resource also causes the client device to detect user interaction with the search result.

In some implementations, the resource is generated such that when it is processed by the client device, the first portion of the landing page is not processed before user interaction with the search result is detected. For example, the resource can cause the client device to display the search result without processing the first portion of the landing page (e.g., without rendering or otherwise processing the first portion with a layout engine). The resource can cause the client device to display the search result without displaying the first portion of the landing page.

In some implementations, the computing system 702 determines whether the query is received from a device classified as a mobile device. For example, the computing system 702 may determine that the query originated from a phone, or from a tablet computer. The computing system 702 may include the ATF portion of the landing page in response to determining that the query was received from a device classified as a mobile device.

In response to detecting user interaction with the search result, the resource causes the client device to display a first portion of the landing page that is embedded within the resource. For example, the resource causes the client device to process (e.g., render) the first portion of the resource that is included in the resource. The first portion of the landing page is included within (e.g., as a part of) the resource, rather than being linked to by the resource. The first portion can be a portion designated as an ATF portion of the landing page.

When displayed, the first portion may fill a browser display area of the client device. For example, the first portion may fill an entire area (e.g., an entire window, frame, or other bounded area) defined by the web browser. The first portion of the landing page includes less than all of the content of the landing page.

The first portion may fill at least a specified amount of area on devices of a particular type or configuration. The first portion may include content that, when displayed, presents a view of top-most portion of the landing page. For example, the first portion can include HyperText Markup Language (HTML) content for a top region of the landing page. The first portion may include content for a single continuous portion of the landing page that is not displayed prior to user interaction with the search result. The first portion excludes at least some of the landing page (e.g., transcoded resource). In some implementations, the first portion is displayed in the same browser context that the search result is displayed in.

In some implementations, the resource is generated so that the first portion of the landing page is not processed (e.g., not rendered) by a client device before the user interacts with the search result. The resource causes the first portion of the landing page to be processed (e.g., rendered) in response to detecting the user interaction, and the processed content is displayed.

In response to detecting user interaction with the search result, the resource causes the client device to request a second portion of the landing page over the network. The second portion can be the remainder of the landing page, for example, BTF content of the landing page. The resource may cause the client device to request the second portion from a server or domain different from the server or domain from which the generated resource is provided.

The resource causes the client device to receive the second portion of the landing page over the network and load the second portion of the landing page. In some implementations, the resource causes the client device to load the second portion of the landing page in a browsing context different from the browsing context in which the first portion is loaded. For example, the resource may cause the client device to dynamically generate an inline Frame that is not initially visible on the client device (e.g., an inline Frame corresponding to an off-screen area). The inline frame may be located below and adjacent to the first portion.

In some implementations, the resource causes the client device to display a plurality of search results each associated with a different landing page. The resource includes an ATF portion of multiple of the different landing pages referred to by the plurality of search results. When the client device detects user interaction with one of the plurality of search results, the resource causes the client device to display the ATF portion of the associated landing page that is included in the resource. The resource also causes the client device to request, receive, and display a BTF portion of the landing page for the search result that was interacted with, in the manner described above. As described above, the second portion may include only BTF content.

The content of the ATF portion of the landing page is referred to as ATF content, and the content of the BTF portion of the landing page is referred to as BTF content. The first portion of the landing page that is embedded in the resource may include all of the ATF content. In some implementations, the first portion may also include some BTF content. For example, the first portion, when displayed on the client device, may extend below the bottom edge of the display area in which the first portion is displayed. In some implementations, the second portion of the landing page, which is retrieved in response to user interaction, includes only BTF content, and may include all of the BTF content.

In some implementations, the first portion of the landing page includes ATF content of the landing page, and the second portion of the landing page includes BTF content of the landing page. The first portion and second portion each both exclude portions of the landing page. For example, the first portion and the second portion may be non-overlapping portions of the landing page. In some implementations, the first portion includes all of the ATF content and excludes at least a portion of the BTF content, and the second portion excludes all of the ATF content.

In some implementations, the first portion and second portion together form the entire content of the landing page. For example, when the landing page is an HTML file, the first portion and second portion together can include all displayable HTML elements of the HTML file. The first portion and second portion may exclude linked content, such as images, or other content that is retrieved as a resource separate the HTML file (e.g., third party advertising content obtained through a separate network transaction).

In some implementations, the first portion of the landing page includes all of the ATF content of the landing page, and the second portion of the landing page includes content of the landing page not included in the first portion. The first portion can include content that provides an initial view of the landing page without requiring any additional transfer of data to the client device. The initial view can fill a display area of the client device. The second portion may include all of the content of the landing page not included in the first portion.

In some implementations, the ATF content in the first portion provides a continuous top region of the landing page. For example, when the first portion is displayed, the ATF content in the first portion provides the entire top portion of the landing page. The ATF content in first portion can provide all of the text in a continuous region at the top of the landing page. The second portion includes content for a continuous region of the landing page that displays adjacent to and below the continuous top region. The second portion includes content for displaying all of the text of the landing page that is not included in the first portion.

In some implementations, the ATF content of the first portion includes all of the content that displays in an initial view of the landing page on the client device, and the second portion includes content that displays at a region outside the initial view of the landing page. The second portion may exclude content that displayed the initial view. The first portion may include all portions of the landing page that produce text that displays in an initial full-screen view of a rendering of the landing page.

In some implementations, when the ATF content in the first portion is displayed, the ATF portion fills a display area of the client device. The display area may be a display area of a web browser of the client device, or a screen of the client device.

In some implementations, the first portion includes content providing at least one view of the landing page that fills the display area. The content in the first portion provides fewer than two non-overlapping views that fill the display area. The second portion may include the remainder of the content of the landing page.

In some implementations, the first portion of the landing page includes all of the text content in an initial view of the landing page on the client device, where the initial view includes the entire portion of the landing page that is visible on the client device before scrolling. Text content can be content that produces text displayed to a user when the landing page is displayed. The initial view can be a complete view that fills a display area defined by a web browser of the client device, and which is a view shown before a user scrolls to adjust the portion of the landing page that is visible on the client device. The first portion may exclude at least some of the text content of the landing page that is visible (e.g., not displayed) in the initial view. For example, the first portion may exclude some or all of the content that is not visible without scrolling by a user. In some implementations, the content of the second portion is visible only after scrolling by a user.

In some implementations, the first portion and the second portion, taken together, comprise all of the text content in the landing page (e.g., where the text content is the text displayed to a user when the landing page is displayed). The second portion of the landing page may exclude text content of the landing page that is displayed in the initial view. For example, the second portion may exclude all of the text content of the landing page that is displayed in the initial view.

In some implementations, the first portion and the second portion correspond to contiguously displayed regions of the landing page. The first portion displays as a top region of the landing page, and the second portion displays as an adjacent region of the landing page located immediately below the top region. The resource causes the top region and the adjacent region to be displayed seamlessly on the client device, for example, with no break or division indicated between the top region and the adjacent region. The top region and the adjacent region may each be continuous regions of the rendered landing page. The top region and the adjacent region, taken together, may span the entire landing page, extending continuously from the top of the landing page to the bottom of the landing page. For example, the adjacent region may extend to the bottom of (e.g., the end of) the landing page.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
   receiving, by the one or more computers and over a communication network, a search results page that identifies one or more search results, wherein the search results page includes above-the-fold content of a document referenced by a particular search result of the one or more the search results;

displaying, by the one or more computers, the one or more search results of the search results page;

after displaying the one or more search results of the search results page, receiving, by the one or more computers, data indicating user interaction with the particular search result;

in response to receiving the data indicating user interaction with the particular search result:

displaying, by the one or more computers, an above-the-fold view of the document in place of the one or more search results, wherein the above-the-fold view of the document is generated based on the above-the-fold content included in the search results page; and sending, by the one or more computers and over the communication network, a request for below-the-fold content of the document.

2. The method of claim 1, further comprising:

after displaying the above-the-fold view of the document and sending the request for the below-the-fold content, receiving the below-the-fold content of the document over the communication network;

detecting a user input to initiate scrolling of the view of the above-the-fold view of the document; and scrolling the display from the above-the-fold view to show at least some of a below-the-fold view of the below-the-fold content that was received in response to sending the request over the communication network for the below-the-fold content.

3. The method of claim 2, wherein scrolling the display comprises providing a view showing part of the above-the-fold content and part of the below-the-fold content, with a seamless transition between the between the above-the-fold content and the below-the-fold content.

4. The method of claim 1, wherein the displaying the one or more search results of the search results page comprises displaying a view of the search results page that does not display the above-the-fold content of the document referenced by the particular search result.

5. The method of claim 1, wherein displaying an above-the-fold view of the document comprises displaying the above-the-fold view of the document without receiving any more content of the document after receiving the search results page.

6. The method of claim 1, wherein displaying the above-the-fold view of the document comprises removing the one or more search results from display such that no search results of the search results page are displayed.

7. The method of claim 1, wherein displaying the one or more search results of the search results page comprises displaying the search results page in a web browser display area, and wherein displaying the above-the-fold view of the document comprises filling the web browser display area with a view of a top portion of the document.

8. The method of claim 1, wherein the above-the-fold content includes content for a continuous top region of the document, and the below-the-fold content includes content for a continuous region of the document for display adjacent to and below the continuous top region.

9. The method of claim 1, wherein receiving the search results page comprises receiving a search results page having the above-the-fold content of the document encoded as text within search results page.

10. The method of claim 1, wherein receiving the search results page comprises receiving a search results page that identifies a plurality of search results each referring to a different landing page, the search results page including above-the-fold content for multiple of the different landing pages referred to by the plurality of search results.

11. The method of claim 1, wherein displaying an above-the-fold view of the document in place of the one or more search results comprises:

removing the search results page from display; and displaying the above-the-fold view of the document in place of the one or more search results without navigating away from the search results page.

12. The method of claim 1, wherein the one or more computers comprise a mobile phone.

13. A system comprising:

one or more computers: and one or more computer-readable media storing instructions that, when executed by the one or more computers, perform operations comprising:

receiving, by the one or more computers and over a communication network, a search results page that identifies one or more search results, wherein the search results page includes above-the-fold content of a document referenced by a particular search result of the one or more the search results;

displaying, by the one or more computers, the one or more search results of the search results page;

after displaying the one or more search results of the search results page, receiving, by the one or more computers, data indicating user interaction with the particular search result;

in response to receiving the data indicating user interaction with the particular search result:

displaying, by the one or more computers, an above-the-fold view of the document in place of the one or more search results, wherein the above-the-fold view of the document is generated based on the above-the-fold content included in the search results page; and sending, by the one or more computers and over the communication network, a request for below-the-fold content of the document.

14. The system of claim 13, wherein the operations further comprise:

after displaying the above-the-fold view of the document and sending the request for the below-the-fold content, receiving the below-the-fold content of the document over the communication network;

detecting a user input to initiate scrolling of the view of the above-the-fold view of the document; and scrolling the display from the above-the-fold view to show at least some of a below-the-fold view of the below-the-fold content.

15. The system of claim 14, wherein scrolling the display comprises providing a view showing part of the above-the-fold content and part of the below-the-fold content, with a seamless transition between the between the above-the-fold content and the below-the-fold content.

16. The system of claim 13, wherein the displaying the one or more search results of the search results page comprises displaying a view of the search results page that does not display the above-the-fold content of the document referenced by the particular search result.

17. The system of claim 13, wherein displaying the one or more search results of the search results page comprises displaying the search results page in a web browser display area, and wherein displaying the above-the-fold view of the document comprises filling the web browser display area with a view of a top portion of the document.

18. One or more non-transitory computer-readable media storing instructions that, when executed by one or more computers, cause the one or more computers to perform operations comprising:

receiving, by the one or more computers and over a communication network, a search results page that identifies one or more search results that each correspond to a different document, wherein the search results page (i) includes above-the-fold content of a document referenced by a particular search result of the one or more the search results and (ii) and omits below the fold content for the document referenced by the particular search result;

displaying, by the one or more computers, the one or more search results of the search results page;

after displaying the one or more search results of the search results page, receiving, by the one or more computers, data indicating user interaction with the particular search result;

in response to receiving the data indicating user interaction with the particular search result:

displaying, by the one or more computers, an above-the-fold view of the document referenced by the particular search result in place of the one or more search results, wherein the above-the-fold view of the document referenced by the particular search result is generated based on the above-the-fold content included in the search results page; and sending, by the one or more computers and over the communication network, a request for the omitted below-the-fold content of the document referenced by the particular search result.

19. The method of claim 1, wherein:

the document is a web page;

the search results page is configured to be displayed with the above-the-fold content of the document hidden from view before user interaction with the particular search result;

the search results page excludes the below-the-fold content of the document; and the above-the-fold content in the search results page enables the one or more computers to display the above-the-fold view of the document after the user interaction with the particular search result and before obtaining any additional content of the document.

20. The method of claim 1, wherein the below-the-fold content of the document is a remaining portion of the document that was omitted from the received search results page.

* * * * *

UNITED STATES PATENT AND TRADEMARK OFFICE
CERTIFICATE OF CORRECTION

| | | |
|---|---|---|
| PATENT NO. | : 10,599,727 B2 | Page 1 of 1 |
| APPLICATION NO. | : 15/698759 | |
| DATED | : March 24, 2020 | |
| INVENTOR(S) | : Mizuno et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this
Second Day of February, 2021

Drew Hirshfeld
*Performing the Functions and Duties of the
Under Secretary of Commerce for Intellectual Property and
Director of the United States Patent and Trademark Office*